United States Patent
Gross et al.

(10) Patent No.: US 10,473,227 B2
(45) Date of Patent: Nov. 12, 2019

(54) ELECTRIC VALVE INCLUDING MANUAL OVERRIDE

(71) Applicant: Donald Gross, Stevensville, MD (US)

(72) Inventors: Donald Gross, Stevensville, MD (US); David Parish, Castlerock, CO (US)

(73) Assignee: Donald Gross, Stevensville, MD (US)

( * ) Notice: Subject to any disclaimer, the term of this patent is extended or adjusted under 35 U.S.C. 154(b) by 23 days.

(21) Appl. No.: 15/381,849

(22) Filed: Dec. 16, 2016

(65) Prior Publication Data

US 2018/0172173 A1 Jun. 21, 2018

(51) Int. Cl.
| F16K 31/05 | (2006.01) |
| G01F 23/24 | (2006.01) |
| F16K 31/04 | (2006.01) |

(52) U.S. Cl.
CPC ............ *F16K 31/05* (2013.01); *F16K 31/047* (2013.01); *F16K 31/055* (2013.01); *G01F 23/241* (2013.01); *Y10T 137/7306* (2015.04)

(58) Field of Classification Search
CPC ...... F16K 31/05; F16K 31/047; F16K 31/055; F16K 37/0033; G01F 23/241; G01F 23/24; G01F 23/22; G01F 23/20; Y10T 137/7306
USPC ............... 251/129.03, 129.04; 137/551, 392; 700/282

See application file for complete search history.

(56) References Cited

U.S. PATENT DOCUMENTS

| 3,757,317 A * | 9/1973 | Kahn ..................... G01F 23/247 137/386 |
| 4,563,780 A * | 1/1986 | Pollack .............. G05D 23/1393 4/668 |
| 5,439,019 A * | 8/1995 | Quandt ................. D06F 39/088 137/2 |
| 5,769,120 A * | 6/1998 | Laverty, Jr. ............. E03D 5/105 137/624.11 |
| 5,975,124 A * | 11/1999 | Stevens, II ................ E03C 1/05 134/113 |
| 6,173,727 B1 * | 1/2001 | Davey .................... A01G 25/16 251/129.04 |
| 6,206,340 B1 * | 3/2001 | Paese ...................... E03C 1/057 251/129.04 |
| 6,286,532 B1 | 9/2001 | van Nieuwstadt et al. |

(Continued)

OTHER PUBLICATIONS

International Search Report dated Apr. 20, 2018, Application No. PCT/US17/66994, 12 pages.

*Primary Examiner* — John Bastianelli
(74) *Attorney, Agent, or Firm* — Rankin, Hill & Clark LLP

(57) ABSTRACT

An electrically operated valve assembly having a manual override includes a valve body, an actuation cam, a shaft, a gear, and a biasing member. The shaft is connected to the actuation cam and includes a projection. The gear defines an opening which selectively receives the projection of the shaft to engage the shaft to the gear. In a first operating condition of the valve assembly, the actuation cam is in an engaged position relative to the valve and the shaft is biased to be engaged with the gear. In a second operating condition of the valve assembly, the actuation cam is in a disengaged position offset along the axis of the shaft from the valve handle and at least partially rotated about the axis of the shaft such that the shaft is disengaged from the gear. Further, a master control module can control one or more such valve assemblies.

12 Claims, 23 Drawing Sheets

(56) References Cited

U.S. PATENT DOCUMENTS

| | | | |
|---|---|---|---|
| 6,337,635 B1 * | 1/2002 | Ericksen | A01G 25/165 137/624.11 |
| 6,956,486 B2 * | 10/2005 | King, Jr. | E03C 1/24 340/618 |
| 7,218,237 B2 * | 5/2007 | Kates | G08B 19/00 137/312 |
| 7,228,874 B2 * | 6/2007 | Bolderheij | E03C 1/04 251/129.04 |
| 7,438,080 B2 * | 10/2008 | Johnson | E02F 3/88 137/209 |
| 7,661,380 B2 * | 2/2010 | Waldecker | G08B 21/20 114/183 R |
| 7,784,490 B1 * | 8/2010 | Stewart | B63B 13/02 137/554 |
| 8,162,236 B2 * | 4/2012 | Rodenbeck | E03C 1/057 251/129.04 |
| 8,201,572 B2 * | 6/2012 | Segal | E03B 7/071 137/15.11 |
| 8,820,342 B2 * | 9/2014 | Do | G05B 9/03 137/15.01 |
| 8,843,241 B2 * | 9/2014 | Saberi | F16K 37/0091 251/129.04 |
| 2005/0082503 A1 * | 4/2005 | Patterson | G06Q 20/327 251/129.04 |
| 2006/0212134 A1 | 9/2006 | Dhawan | |
| 2008/0156121 A1 | 7/2008 | Radomsky et al. | |
| 2008/0223951 A1 * | 9/2008 | Tracey | A01G 25/16 239/71 |
| 2008/0230623 A1 * | 9/2008 | Macnow | F16K 31/46 239/11 |
| 2009/0302249 A1 * | 12/2009 | Fincher | F24F 11/30 251/129.04 |
| 2010/0082132 A1 | 4/2010 | Marruchella | |
| 2016/0341333 A1 | 11/2016 | Podpaly et al. | |
| 2016/0342161 A1 | 11/2016 | Allen et al. | |

\* cited by examiner

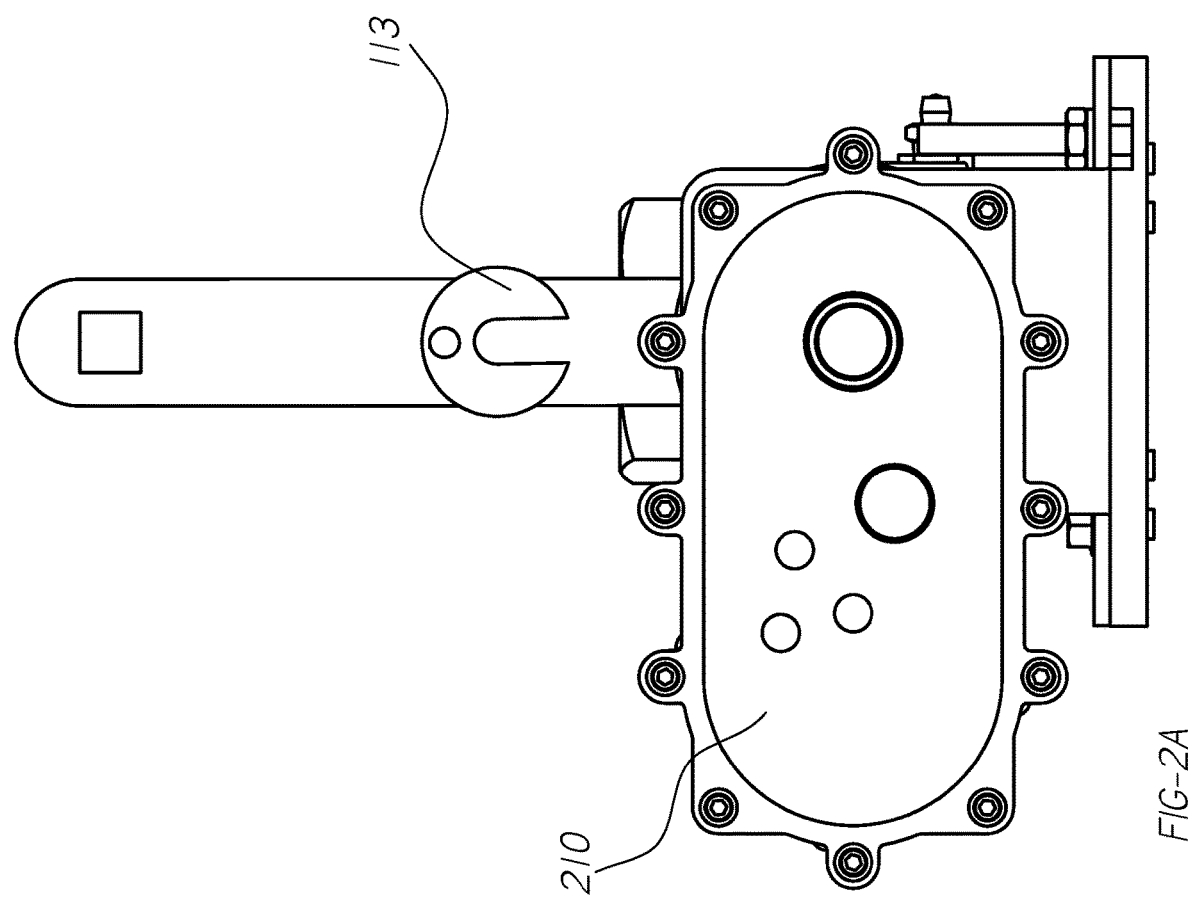

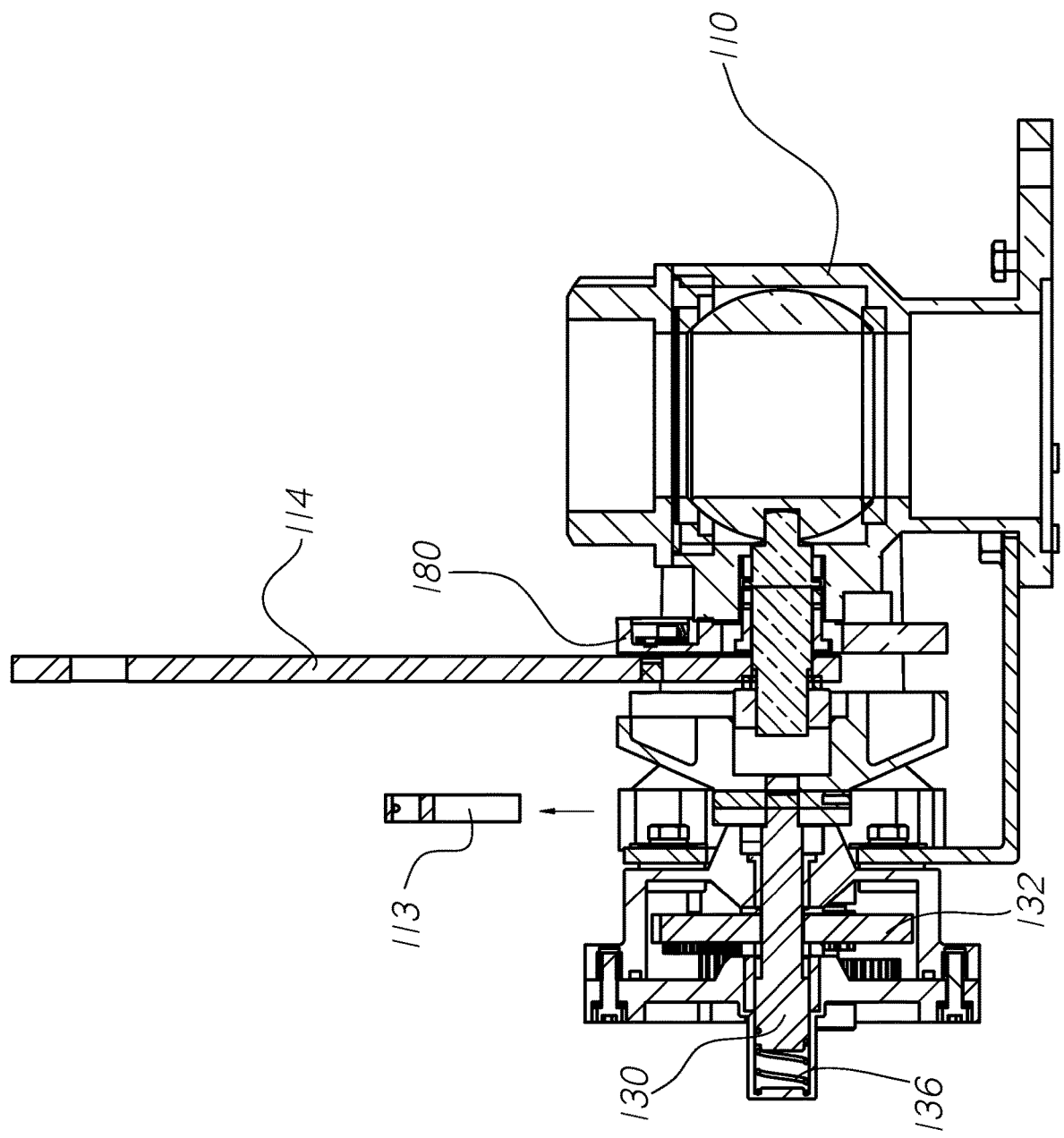

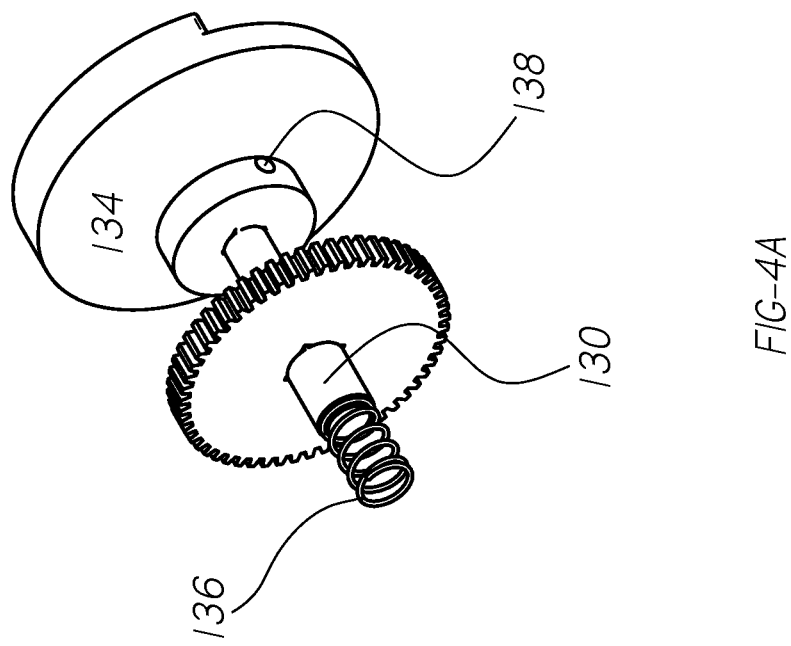

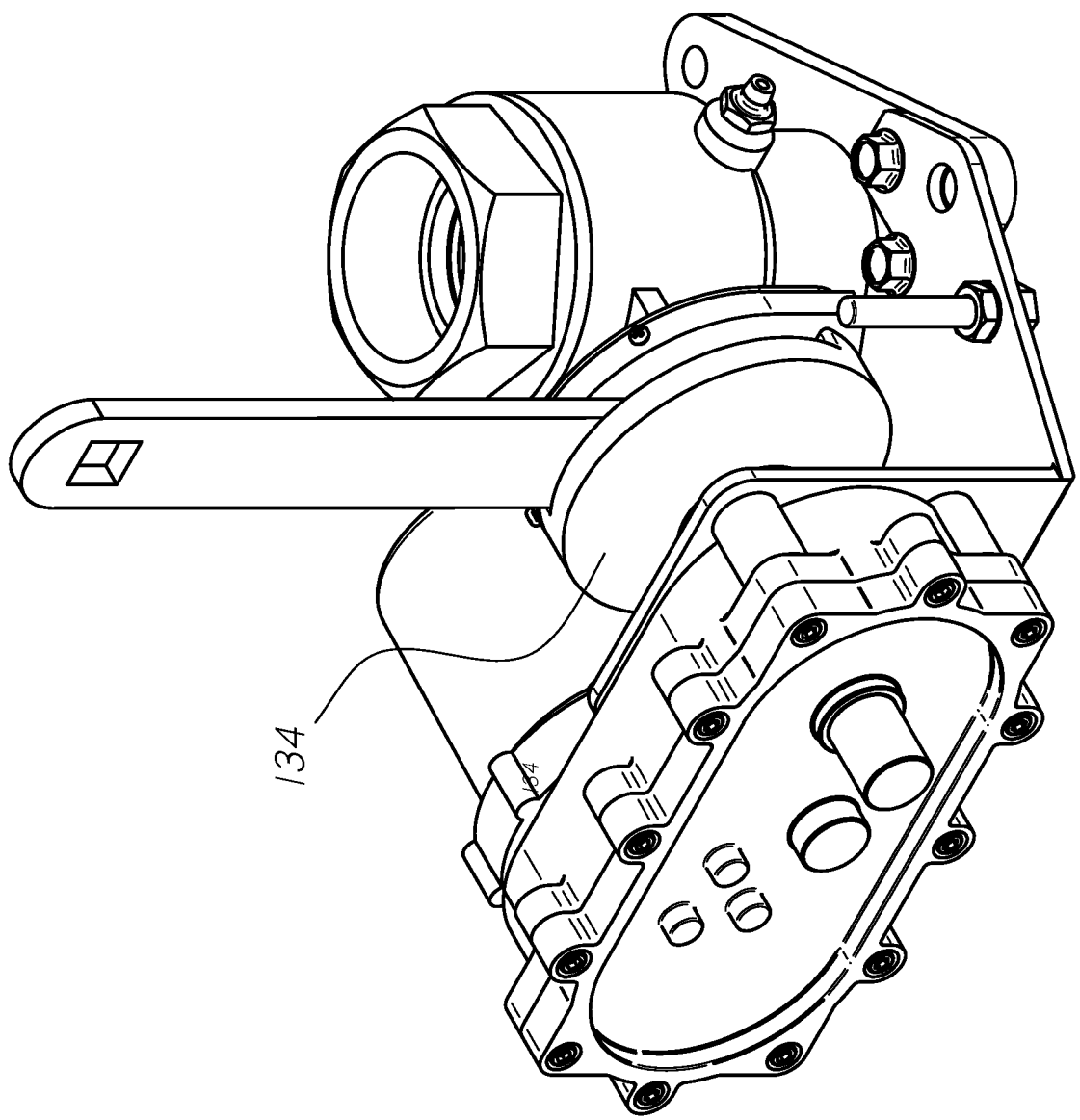

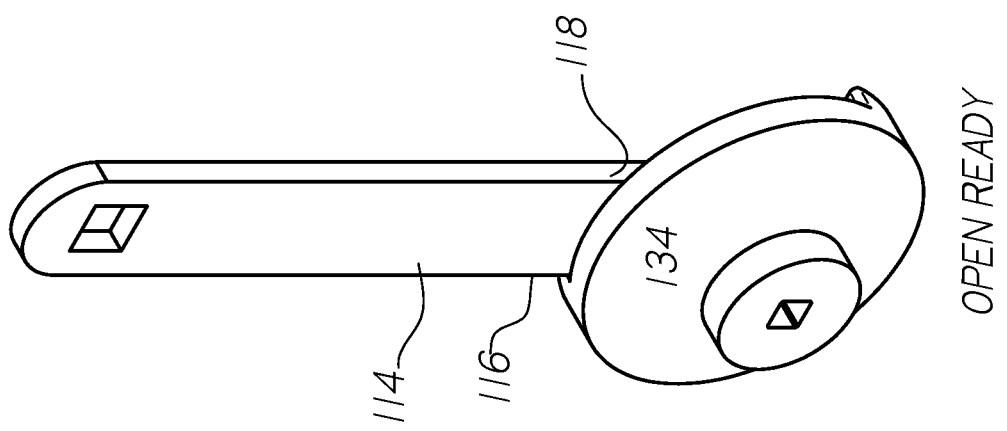

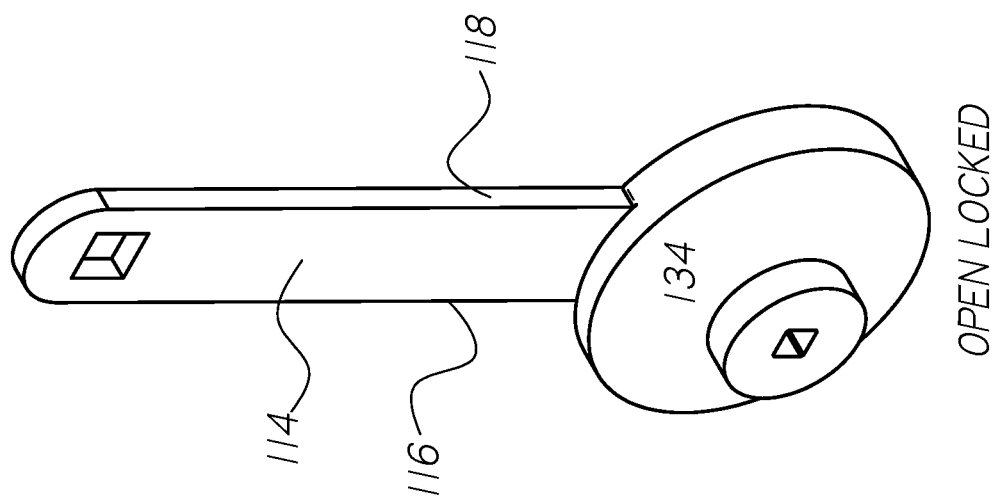

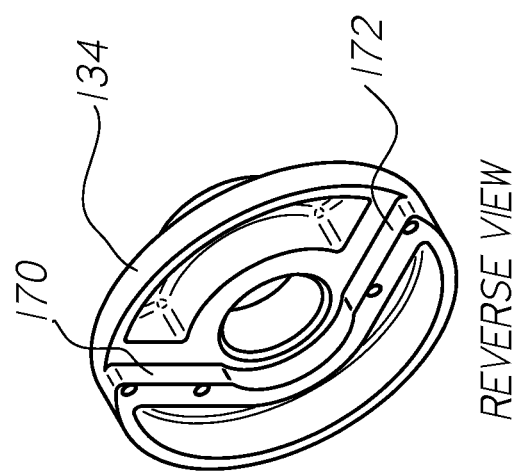

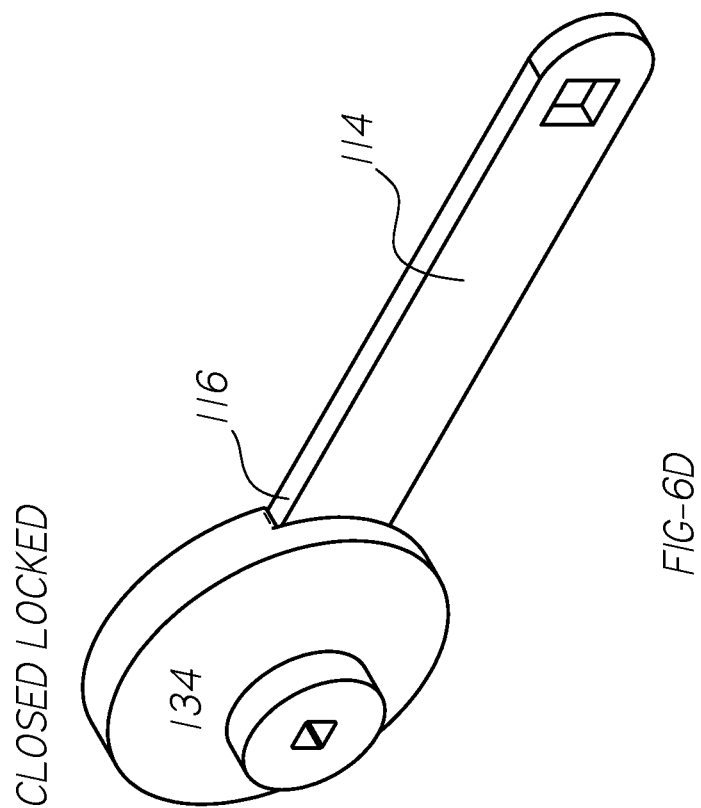

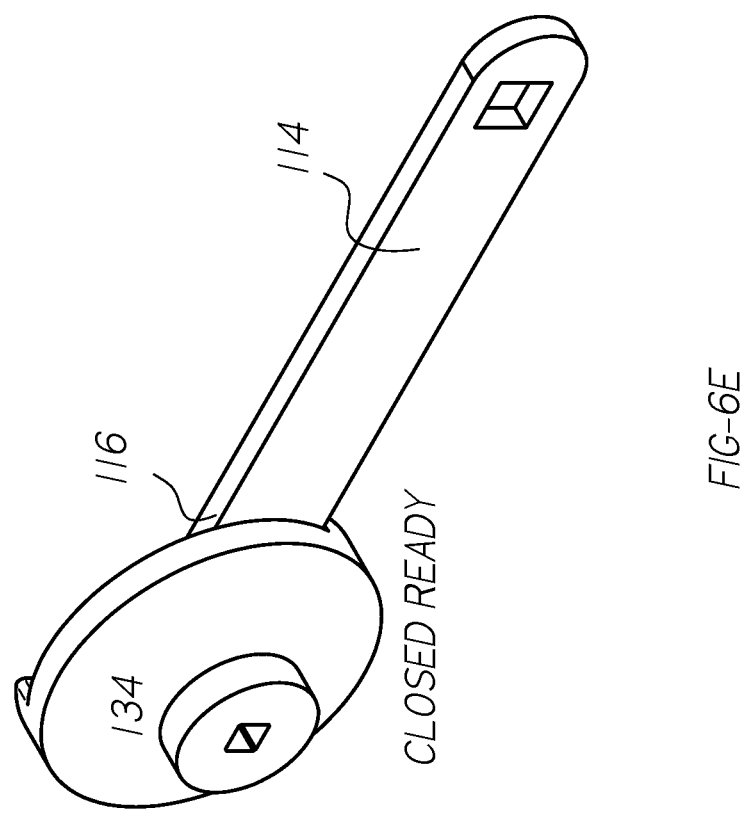

ELECTRIC VALVE INCLUDING MANUAL OVERRIDE

BACKGROUND

Electrically actuated valves are very popular; opening a closed valve or closing an open valve with the touch of a button from a remote location has long been convenient and desirable. As a result, valves including motor drives have long been used in manufacturing and in the marine industry, and in other application areas to provide mechanical power where valve actuation by human power was inconvenient or impossible, and remote operation thereof.

It has long been recognized that an electrically operated valve must have a manual override capability, but the methods for achieving manual operation are not intuitive, and the procedure is physically difficult, time consuming, and often requires the use of tools. Furthermore, in a system that includes multiple valves, often in multiple sizes, such as on a marine vessel, monitoring and controlling the valves presents additional challenges to the designer and operator alike.

A common problem with valves in the marine industry has been the accumulation of nuisance growth on internal valve parts, making infrequently actuated valves extremely difficult to operate. Frequent valve actuation is the best method for minimizing growth buildup, but doing so has not been practical or convenient.

In marine vessels, the presence of excess water in the bilge area is problematic and dangerous. There are numerous methods of alerting the vessel operator to the condition, but none identify the exact location of the high water in the vessel.

BRIEF DESCRIPTION

According to one or more aspects, a valve assembly including a manual override includes a valve body, an actuation cam, a shaft, a gear, and a biasing member. The actuation cam selectively engages the valve handle. The shaft is connected to the actuation cam and includes a projection and delineates an axis. The gear defines an opening which selectively receives the projection of the shaft to engage the shaft to the gear. The biasing member biases the shaft in a direction along the axis of the shaft towards the valve body. In a first operating condition of the valve assembly, the actuation cam is in an engaged position relative to the valve handle and the shaft is biased by the biasing member to be engaged with the gear. In a second operating condition of the valve assembly, the actuation cam is in a disengaged position offset along the axis of the shaft from the valve handle and at least partially rotated about the axis of the shaft such that the shaft is disengaged from the gear.

The valve assembly can include a valve handle pivotally mounted to the valve body to open and close the valve body. The actuation cam can include a first cam face and a second cam face. In the first operating condition of the valve assembly, the first cam face comes in contact with a first edge of the valve handle when the actuation cam is rotated in a first direction. In the second operating condition of the valve assembly, the second cam face comes in contact with a second edge of the valve handle when the actuation cam is rotated in a second direction.

According to one or more aspects, a master control module for controlling one or more valve assemblies includes a receiver, a display, an input component, a processor, and a transmitter. The receiver receives one or more positional status signals from one or more corresponding individual control modules. Each positional status signal is indicative of a positional status of a valve assembly of one or more valve assemblies corresponding to a respective individual control module of the one or more individual control modules. The display renders one or more graphic elements indicative of the positional status for the respective valve assemblies corresponding to the one or more individual control modules. The input component receives a command pertaining to one or more of the valve assemblies. The processor generates one or more sets of control signals for one or more of the valve assemblies associated with the command. The transmitter transmits the one or more sets of control signals to the one or more individual control modules.

According to one or more aspects, a method for controlling one or more valve assemblies can include receiving one or more positional status signals from one or more corresponding individual control modules, rendering one or more graphic elements indicative of the positional status for the respective valve assemblies corresponding to the one or more individual control modules, receiving a command pertaining to one or more of the valve assemblies, generating one or more sets of control signals for one or more of the valve assemblies associated with the command, and transmitting the one or more sets of control signals to the one or more individual control modules. Each positional status signal is indicative of a positional status of a valve assembly of one or more valve assemblies corresponding to a respective individual control module of the one or more individual control modules.

According to one or more aspects, a system for controlling one or more valve assemblies includes a receiver, a display, an input component, a processor, and a transmitter. The receiver receives one or more positional status signals from one or more corresponding individual control modules. Each positional status signal is indicative of a positional status of a valve assembly of one or more valve assemblies corresponding to a respective individual control module of the one or more individual control modules. The display renders one or more graphic elements indicative of the positional status for the respective valve assemblies corresponding to the one or more individual control modules. The input component receives a command pertaining to one or more of the valve assemblies. Commands include at least one of an open command, a close command, a lock command, an unlock command, or an automatic command. The processor generates one or more sets of control signals for one or more of the valve assemblies associated with the command. The transmitter transmits the one or more sets of control signals to the one or more individual control modules.

BRIEF DESCRIPTION OF THE DRAWINGS

FIG. 2A is a front view of the valve assembly in a second operating condition, according to one embodiment.

FIG. 2B is a cross-sectional view of the valve assembly of FIG. 2A in a second operating condition along the line A-A.

FIGS. 4A-4E are illustrations of the manual override portion of the valve assembly of FIGS. 1A-1B.

FIGS. 6A-6E are illustrations of a variety of handle positions of the valve assembly of FIGS. 1A-1B.

DETAILED DESCRIPTION

Figure 1A:
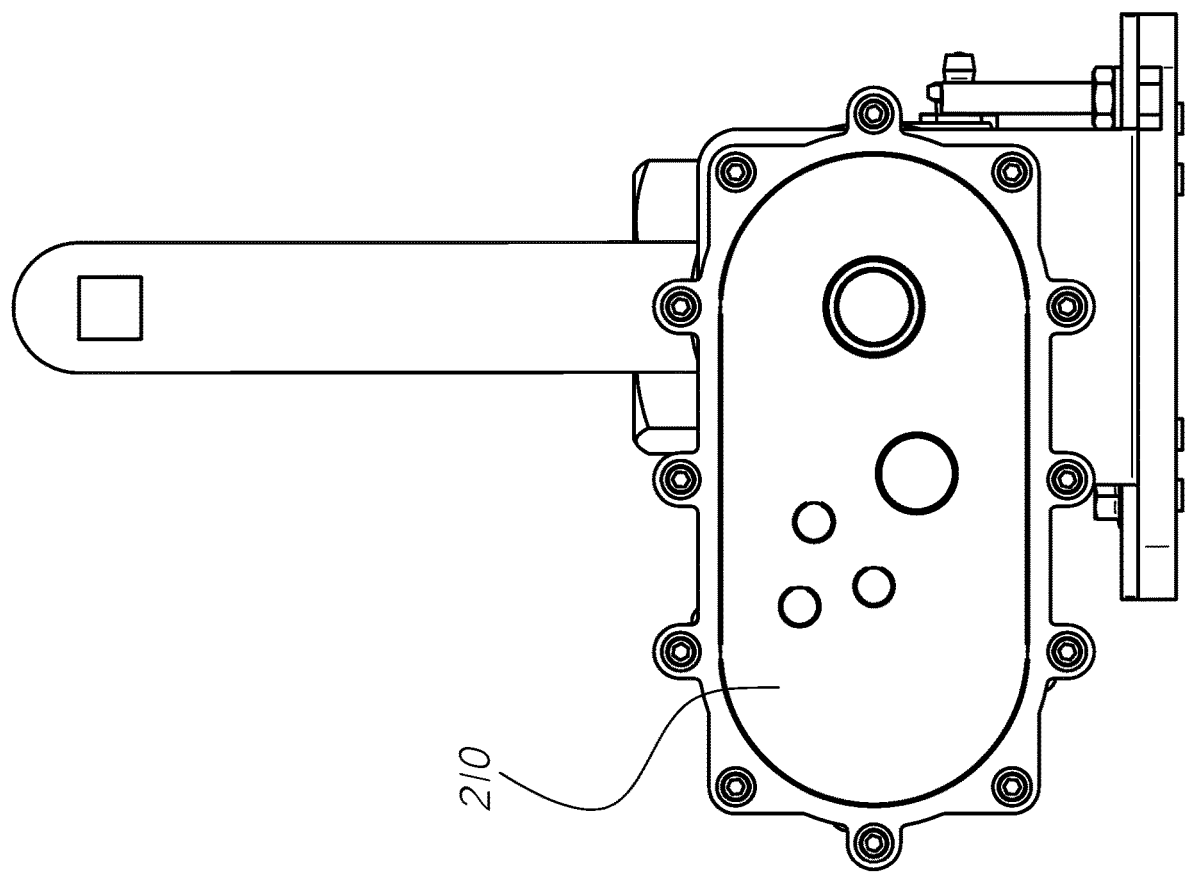
FIG. 1A is a front view of a valve assembly including a manual override in a first operating condition, according to one embodiment.

With reference to FIGS. 1-10, an exemplary valve assembly 100 according to the present disclosure can include a valve body 110 and a manual override portion 112. The valve body 110 controls fluid flow while the manual override portion 112 enables the valve body 110 to be operated in at least two operating conditions. For example, in a first operating condition, the valve handle 114 can be driven electrically, such as by an electric motor or other drive mechanism. In a second operating condition, the valve handle 114 can be manually operated. This may be useful in a scenario where power is lost, for example. The ability to quickly open or close the valve assembly 100 by manually manipulating the valve handle 114 is advantageous for safe operation of vessel systems and for the overall integrity of a vessel. The manual override portion 112 can be set to the second operating condition manually and can be returned to the first operating condition either manually or electrically, as will be described in greater detail herein.

Although not depicted in the figures, the valve body 110 can include an aperture or an opening which allows fluid to flow therethrough and a seal element which toggles between an open position and a closed position. The valve body 110 houses the seal element, which is situated between seats of the valve body 110 and is connected to an actuation axle. The actuation axle is connected to a valve handle 114, which is adapted to be adjustable between an open position and a closed position. The valve handle 114 includes a first edge 116 and a second edge 118. It should be appreciated by one skilled in the art that movement of the valve handle 114 causes the seal element to move between the open position and closed position relative to the aperture. In this way, control of fluid flow can be achieved by rotation of the valve handle 114. Explained another way, the valve handle 114 is mounted to the valve body 110 such that the valve handle 114 is pivotable about an axis of the actuation axle to open and close the valve body 110.

Figure 4B:
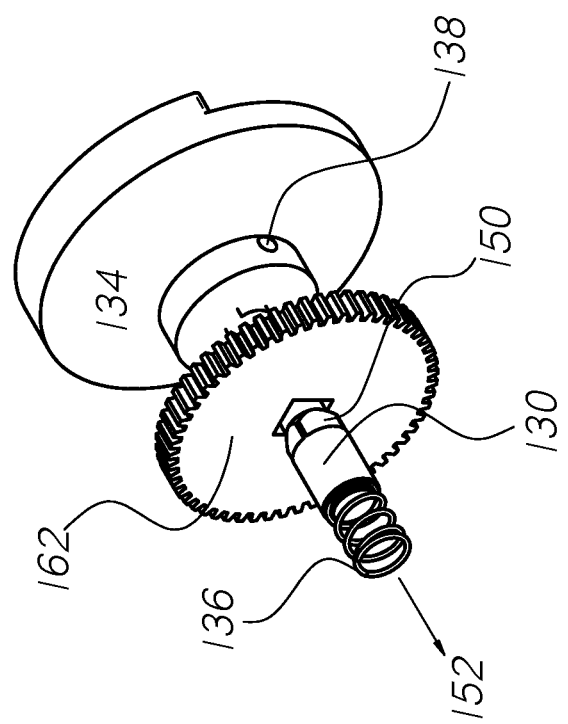
Figure 4C:
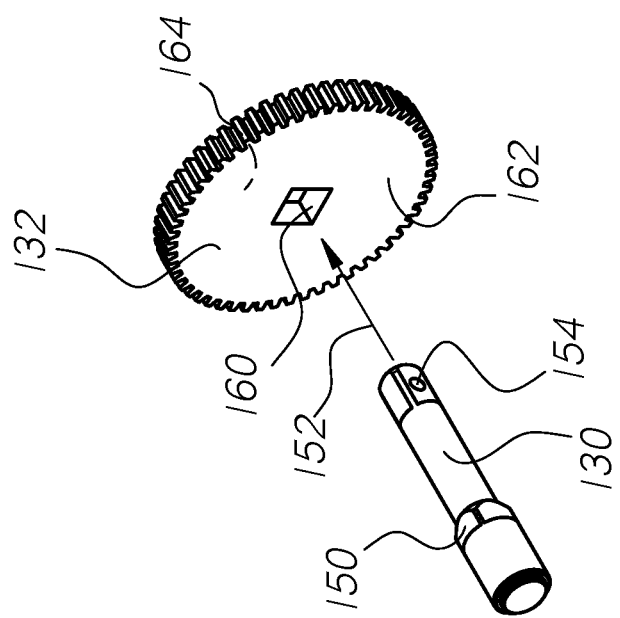

In FIGS. 4A, 4B, and 4C, the manual override portion 112 includes a shaft 130, a gear 132, an actuation cam 134, a biasing member 136, and a fastening element 138. The shaft 130 is elongated, includes a projection 150, and rotates about an axis 152. The shaft 130 is connected to the actuation cam 134 by the fastening element 138 through an opening 154 in the shaft 130. The fastening element 138 can be a screw, a pin, or other type of fastener. Because the actuation cam 134 can selectively engage with the valve handle 114 and the valve handle 114 is connected to the actuation axle, an axis 152 of the shaft 130 and an axis of the actuation axle can be coaxial. The projection 150 of the shaft 130 can be rectangular or square in shape, although other shapes can be used.

The gear 132 defines an opening 160. The opening 160 of the gear 132 extends from a first side 162 of the gear 132 through a second opposite side 164 of the gear 132. The first side 162 of the gear 132 faces the biasing member 136. The second side 164 of the gear 132 faces the valve body 110. The opening 160 of the gear 132 has a corresponding shape similar in dimensions to the projection 150 of the shaft 130 and can mate with the shaft 130 via receipt of the projection 150 in the opening 160. For example, the projection 150 of the shaft 130 can have slightly smaller dimensions than the opening 160 to effectively engage or disengage with the opening 160 of the gear 132. Thus, the opening 160 defined by the gear 132 enables selective engagement with the projection 150 of the shaft 130.

In FIGS. 6A-6E, the actuation cam 134 is adapted to selectively engage the valve handle 114 and includes a first cam face 172 and a second cam face 170, which can be disposed at right angles to one another. The cam faces 170 and 172 of the actuation cam 134 can be shaped to facilitate engagement with other components. For example, in FIGS. 3A-3B, the actuation cam 134 is in an engaged position relative to the valve handle 114 of the valve body 110. Because the actuation cam 134 is shaped, and due to the proximity of the actuation cam 134 to the valve handle 114 when the actuation cam 134 is in the engaged position, rotation of the cam about the axis of the shaft 130 results in the first cam face 172 coming in contact with the first edge 116 of the valve handle 114 when the actuation cam 134 is rotated in a first direction. Conversely, when the actuation cam 134 is rotated in a second direction, the second cam face 170 comes in contact with the second edge 118 of the valve handle 114. Thus, the actuation cam 134 and the valve handle 114 are positioned with respect to one another such that the first cam face 172 and the second cam face 170 can be brought into contact with opposite edges 116, 118 of the handle as a result of rotation of the actuation cam 134 while the valve assembly 100 is in the first operating condition.

Figure 7A:
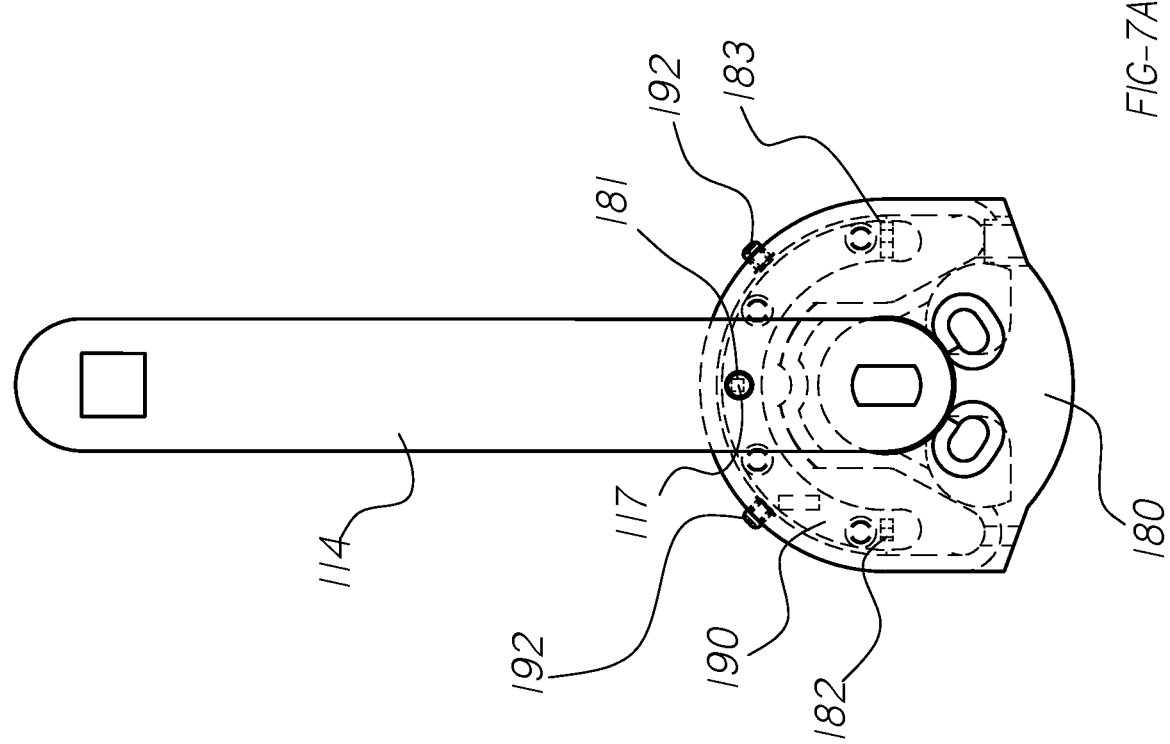
FIGS. 7A-7C are illustrations of position sensing and water sensing components of the valve assembly of FIGS. 1A-1B.
Figure 7B:
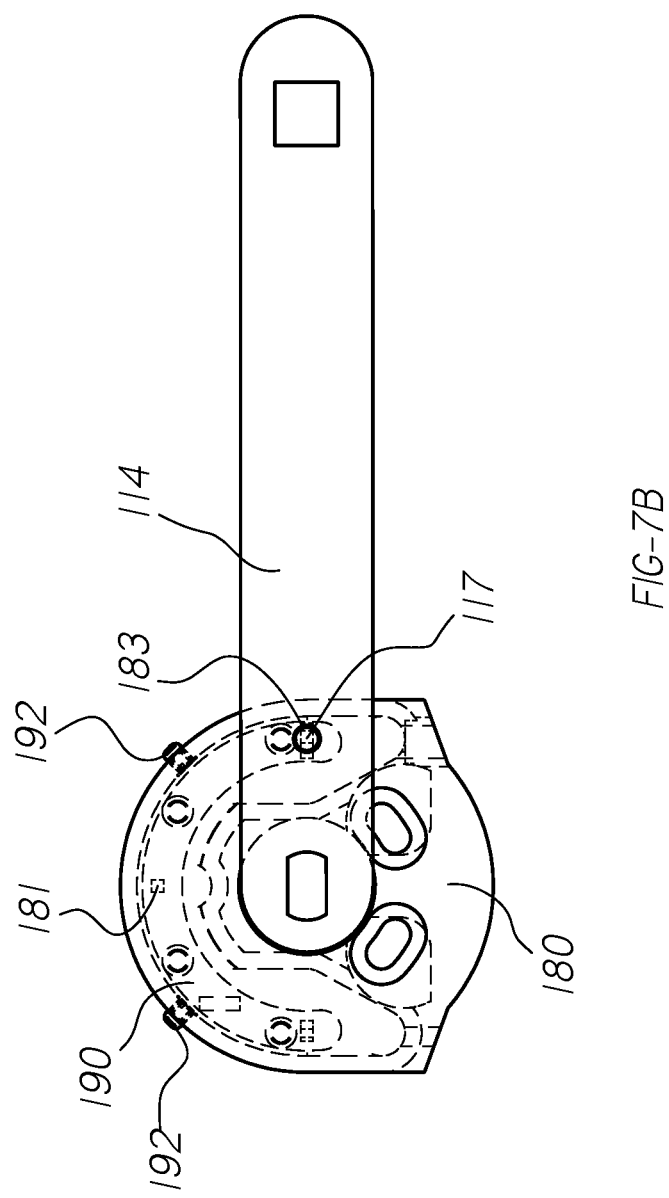
Figure 7C:
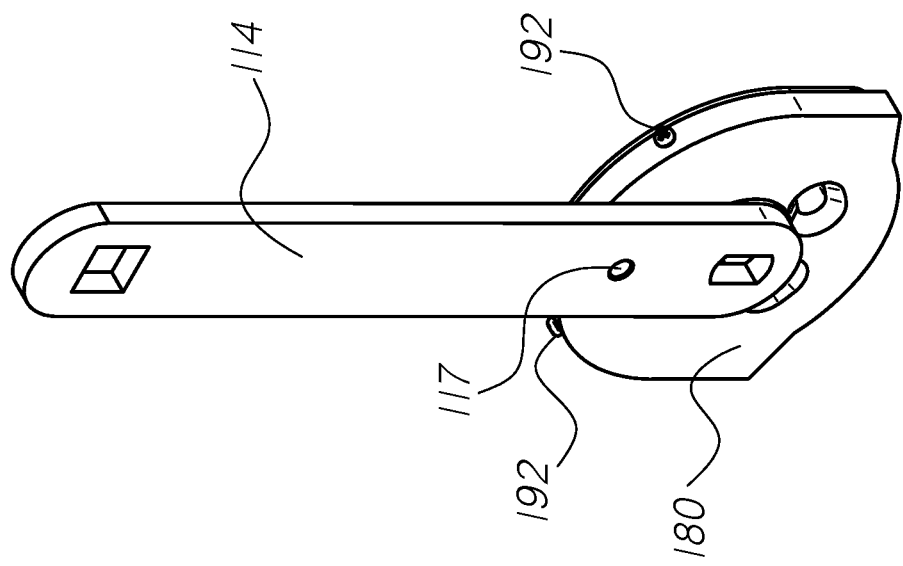

FIG. 7A (in partial phantom view) shows a magnet 117 disposed in the handle 114 and aligned with a position sensor 181 of the housing 180. As shown in FIG. 7A, the handle 114 is vertical relative to the housing 180, resulting in the valve aperture being open. Conversely, FIG. 7B shows the magnet 117 in handle 114 aligned with a different position sensor 183 of the housing 180, which defines the handle 114 to be horizontal relative to the housing 180. Thus, the valve aperture is determined to be closed (e.g., based on the alignment of the magnet 117 with the position sensor 183). FIG. 7C is a perspective view of FIG. 7A.

There are two methods by which the valve can be manually operated. During normal operation, when power is available, following completion of an "open valve" or "close valve" command, the individual control module 220 returns the actuation cam 134 to a "ready position" shown in FIG. 6A (open ready position), or FIG. 6E (closed ready position). In this way, the 90-degree "L" shaped opening of cam 134 (created by the faces 170 and 172 shown in FIG. 6C) allows the handle 114 to be manually operated at any time.

Figure 4E:
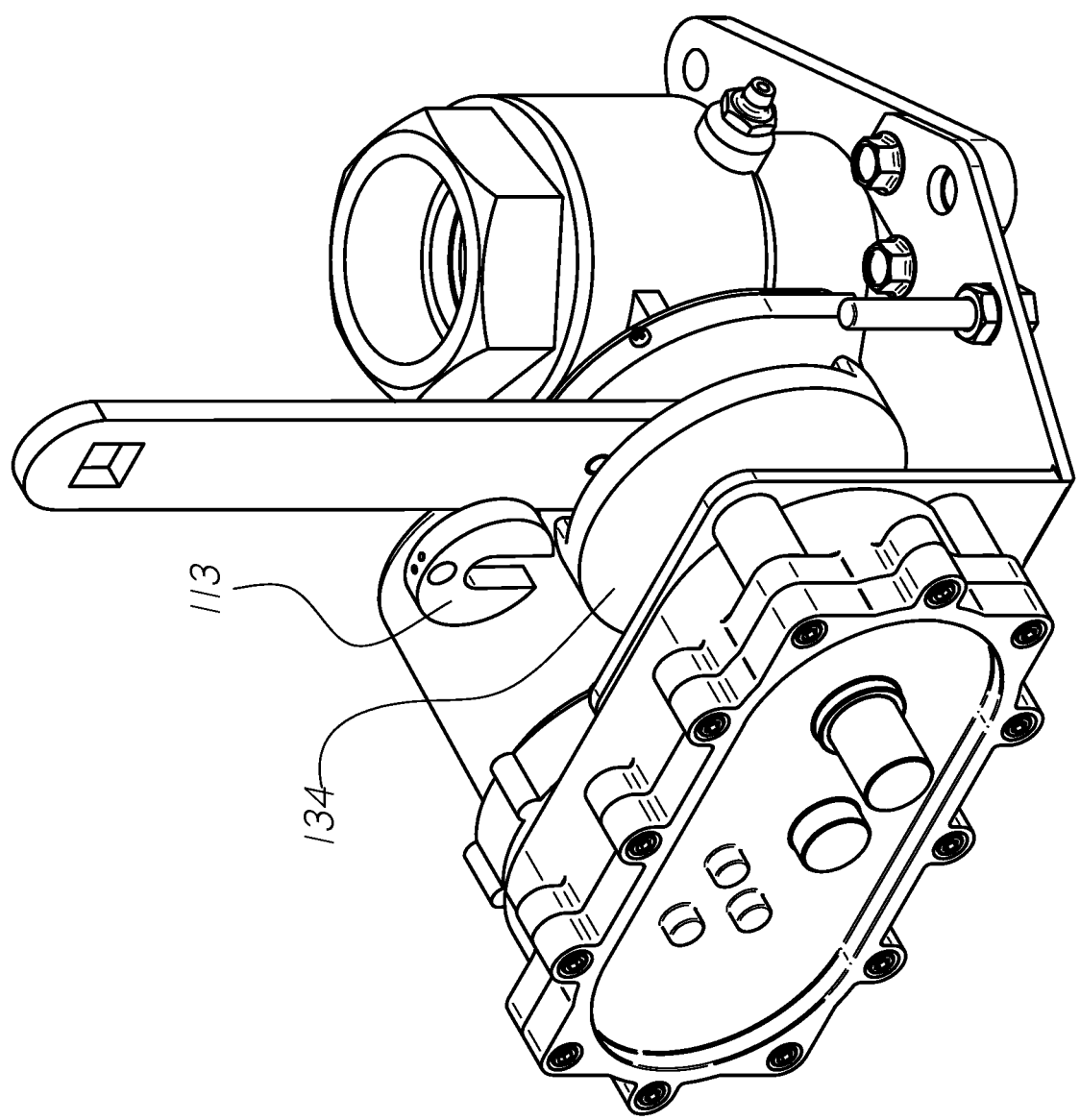

Conversely, in the second operating condition of the valve assembly 100, shown in FIG. 2B and FIG. 4E, the key 113 is removed and the actuation cam 134 is in a disengaged position, offset from the valve handle 114 along the axis of the shaft 130 and rotationally oriented about the axis of the shaft 130 such that the shaft 130 is disengaged from the gear 132. When the shaft 130 is disengaged from the gear 132, the projection 150 of the shaft 130 can contact or rest on the first side 162 of the gear 132, facing the biasing member 136. The actuation cam 134 and the shaft 130 are connected by the fastening element 138 and move as a unit relative to the gear 132, which remains stationary in either of the operating conditions.

Because the actuation cam 134 and the shaft 130 move as a unit, disengaging the actuation cam 134 from the valve body 110 or the valve handle 114 results in the projection 150 of the shaft 130 disengaging from the opening 160 of the gear 132. In this manner, the valve handle 114 can be operated manually, to rotate in either direction to a desired position (e.g., the open position or the closed position) in a manual fashion while the valve assembly 100 is in the second operating condition. This can be achieved when the user removes the key 113, and pulls the actuation cam 134 away from the valve body 110 towards the biasing member 136, overcoming a biasing force, and rotates the handle 114 so that the projection 150 does not mate or engage with the gear 132 when the user releases the actuation cam 134. Rather, the projection 150 will contact or rest on the first side 162 of the gear 132 as a result of the biasing force from the biasing member 136. This can be seen more clearly in FIGS. 4B and 4C.

When the key 113 is removed and the actuation cam 134 is pulled away from the valve handle 114, the first and second edges 116, 118 of the valve handle 114 are repositioned (contrasted between FIG. 1B and FIG. 2B) such that the first cam face 172 and the second cam face 170 of the actuation cam 134 cannot be brought into contact with opposite edges 116, 118 of the valve handle 114 when the valve handle 114 is rotated, as seen in FIG. 2B. In this way, the user can change operation of the valve assembly 100 from the first operating condition to the second operating condition without making other prior adjustments and without requiring the use of tools or disengagement of a drive mechanism from the valve assembly 100.

With the second method, if power is lost during an open valve or a close valve operation, the cam 134 stops in the position it was in at the time power was lost (e.g., diagonal, halfway between open and closed), and is not in the "ready position". In this case, manual operation would not be possible. To allow manual operation in both directions, an override procedure described herein is conducted.

The biasing member 136 biases the shaft 130 in a direction along the axis of the shaft 130 toward the valve body 110. A key 113 engages shaft 130 axially to assure engagement between shaft projection 150 and gear opening 160. In one embodiment, the biasing member 136 is a spring. Therefore, in the first operating condition of the valve assembly 100, shown in FIGS. 4A and 4D, the actuation cam 134 is in the engaged position relative to the valve body 110 and held in place because the shaft 130 is biased by the biasing member 136 to be engaged with the gear 132. In other words, the biasing member 136 and the key 113 hold the projection 150 of the shaft 130 in the engaged position within the opening 160 of the gear 132. This can be seen more clearly in FIG. 4A.

In one embodiment, the gear 132 can be a portion of a gear assembly including multiple gears, such as reduction gears which are arranged to provide reduction gearing to match the rotational speed and torque of the drive mechanism to a desired actuation speed and force.

Figure 1B:
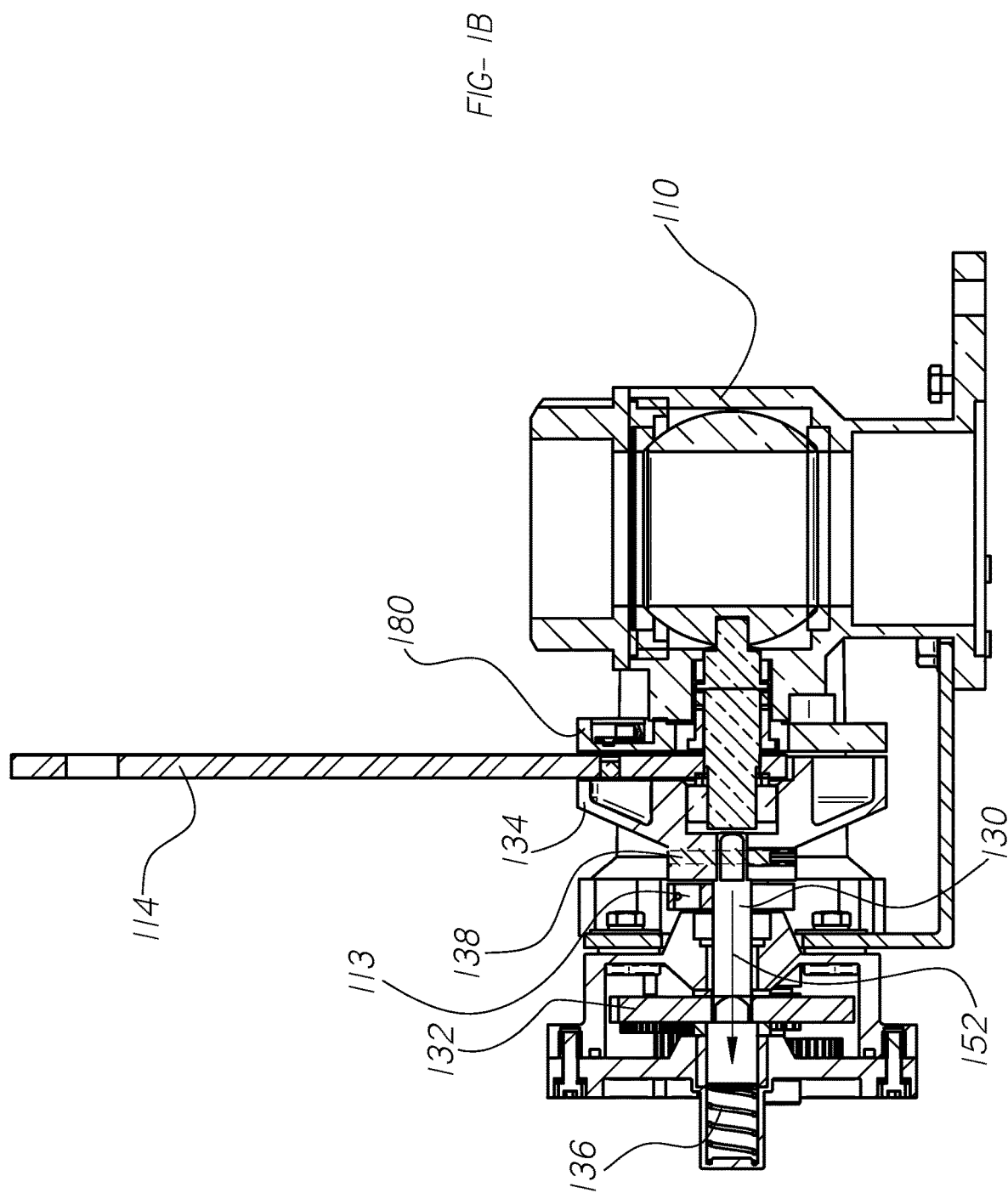
FIG. 1B is a cross-sectional view of the valve assembly in the first operating condition along the line A-A.
Figure 3A:
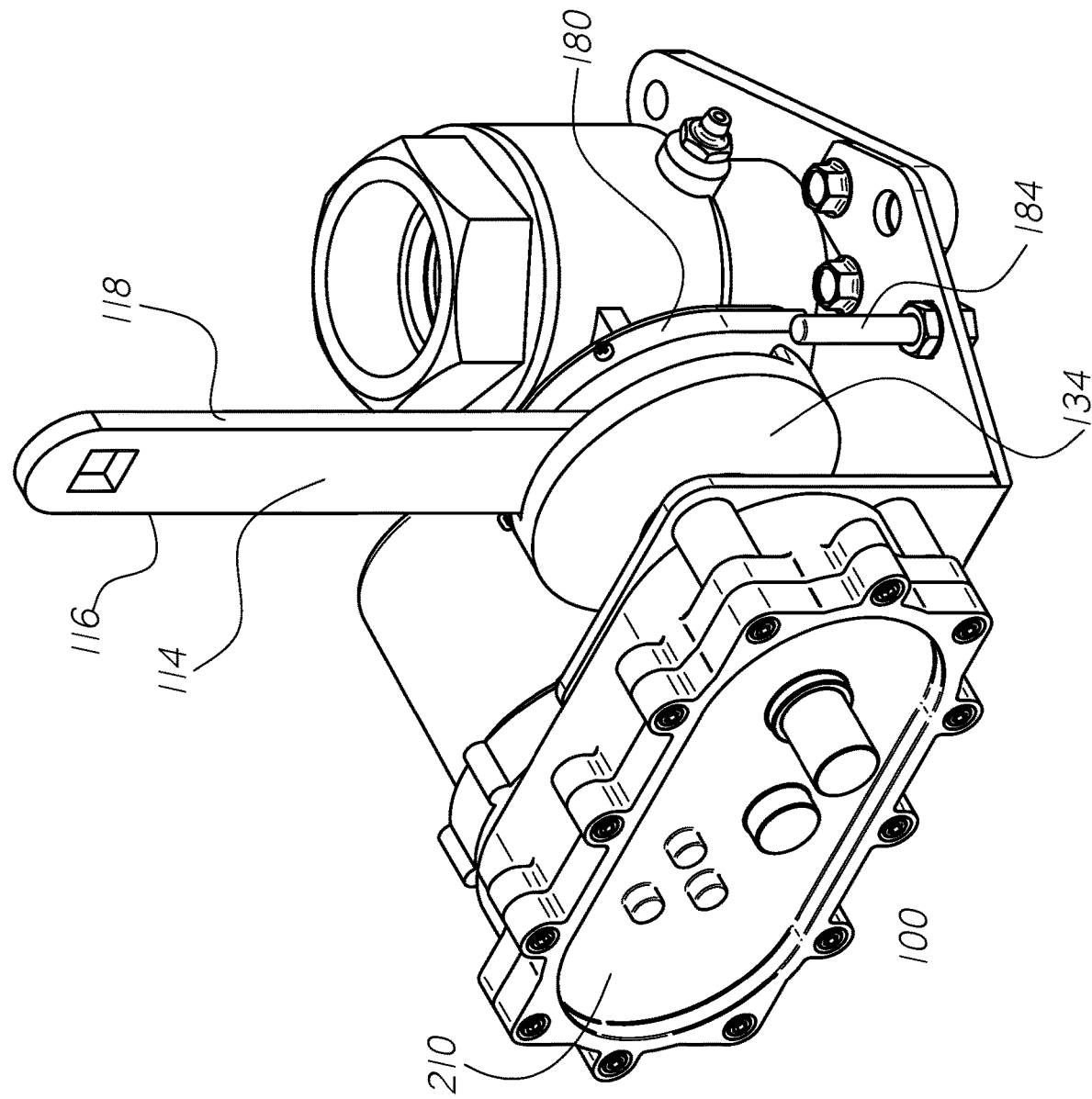
FIGS. 3A-3B are perspective views of the valve assembly of FIGS. 1A-1B.
Figure 3B:
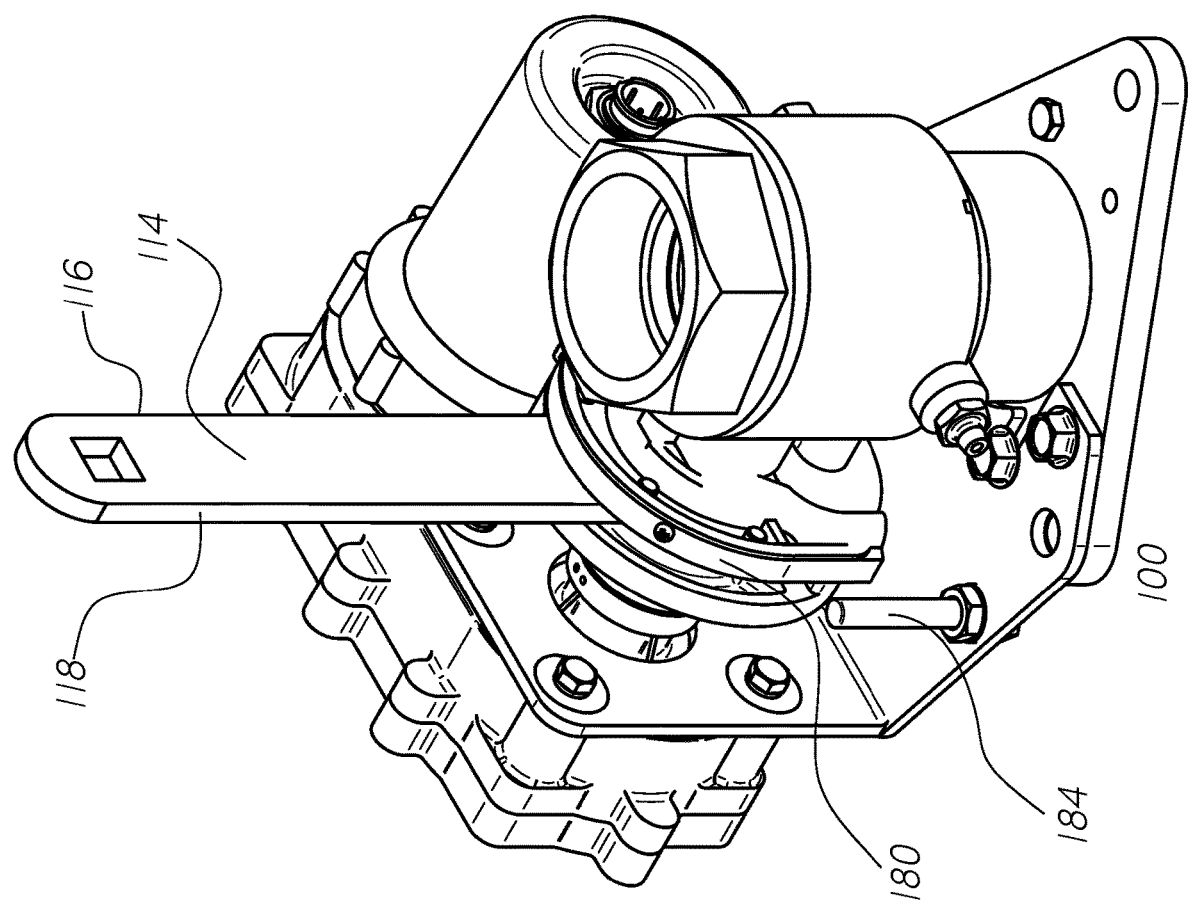

FIGS. 4A-4E are illustrations of the manual override portion 112 of the valve assembly 100, according to one embodiment. In the exemplary embodiment depicted in FIGS. 4B, 4C, and 4E, the shaft 130 has a square projection 150 that is adapted to engage the square opening 160 in the gear 132 and is disengaged from the gear 132. When power is applied by the drive mechanism to the shaft while the projection 150 of the shaft 130 is disengaged from the gear 132, the shaft rotates and the biasing member 136 causes the projection 150 to mate with the opening 160 of the gear 132, as depicted in FIG. 1B and FIG. 4D. In this way, the valve assembly 100 can be automatically placed into the first operating condition from the second operating condition by activating the drive mechanism.

Because the projection 150 of the shaft 130 of FIG. 4C is square, rotation of the shaft 130 by the drive mechanism and biasing from the biasing member 136 will cause the shaft 130 to re-engage the gear 132 in 90-degree increments. It will be appreciated that other shapes can result in larger or smaller degree re-engaging increments.

It will be appreciated that the valve assembly 100 can be placed into the first operating condition from the second operating condition by manually rotating the actuation cam 134 such that the projection 150 of the shaft 130 is in alignment with the opening 160 of the gear 132. The biasing member 136 applies the biasing force to the shaft 130, pushing the shaft 130 and projection 150 into the engaged position (and similarly, the actuation cam 134 and the valve body 110 or valve handle 114 into the engaged position). Either way, the biasing member 136 provides the biasing force to enable re-engagement from the second operating condition into the first operating condition.

In both embodiments, counter-clockwise rotation of the valve handle 114 causes the valve body 110 to open and clockwise rotation of the valve handle 114 causes the valve body 110 to close. In other embodiments, clockwise rotation of the valve handle 114 causes the valve body 110 to open and counter-clockwise rotation of the valve handle 114 causes the valve body 110 to close. In one embodiment, the valve assembly 100 is open when the valve handle 114 is in a vertical position and closed when the valve handle 114 is in a horizontal position with respect to the valve body 110.

Additionally, the valve assembly 100 can include a housing 180 (shown in FIGS. 3B and 7A) and one or more position sensors 181, 182, and 183. For example, the position sensors 182 and 183 (shown in FIG. 7A) can determine when the valve handle 114 is rotated to a horizontal, closed position in contact with a hard stop 184 (shown in FIG. 3B). According to one aspect, a current sensor 190 senses an amount of current drawn by a drive mechanism 210 (shown in FIG. 5) and determines whether the valve handle 114 is fully actuated to a horizontal or closed position such that one of the edges 116 or 118 of the valve handle 114 is in contact with the hard stop 184. Sensor 181 determines when the valve handle 114 is in the vertical (open) position relative to the housing 180. The valve assembly 100 can include sensors, such as the current sensor 190 (shown in FIG. 7A) which provides motor current signals indicative of a position of the handle 114 against the hard stop 184 or a failure of the drive mechanism. Other examples of sensed parameters include voltages (e.g., associated with a battery level, the presence of high water), torque, force, etc. associated with any of the components disclosed herein.

With reference to FIGS. 7A-7C, water level sensors 192 are used to detect a high water level when water is in contact with two or more (or both) of the water level sensors 192. When the water is at this level (e.g., higher than both of the water level sensors 192), an electrical path is established between the two or more water level sensors 192, thereby completing a circuit. This circuit causes transmission of a water level status signal to initiate an alert that there is a high water condition at that particular valve assembly location.

Figure 5:
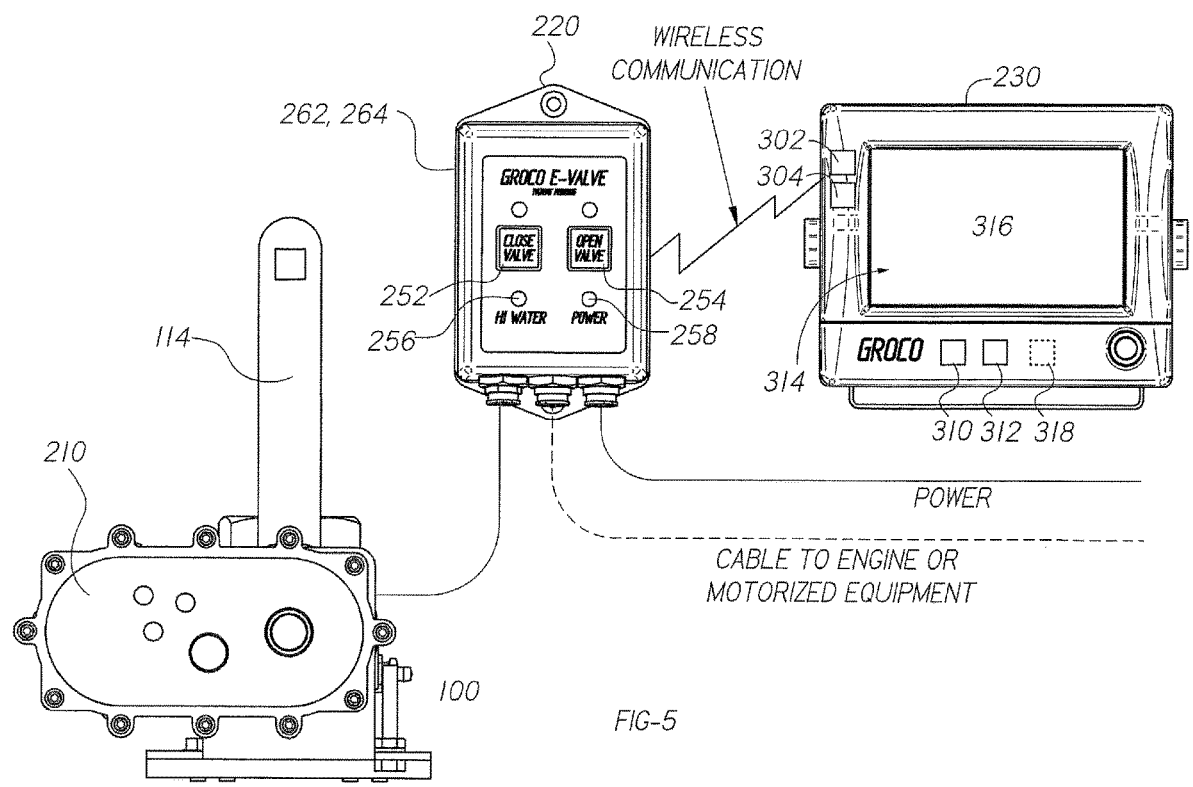
FIG. 5 is a component diagram of a system for maintaining and operating valve assemblies, such as the valve assembly of FIGS. 1A-1B.

FIG. 5 is a component diagram of a system for controlling, maintaining, and operating one or more valve assemblies, according to one embodiment. The system can include a number of valve assemblies, drive units, individual control modules, and a master control module 230. However, for the sake of explanation merely one valve assembly 100, drive unit 210 (also shown in FIGS. 3A-3B), individual control module 220, and master control module 230 are described. In one embodiment, any number of the valve assemblies can be configured similarly to the valve assembly 100 of FIG. 1B.

The individual control module 220 is a stand-alone module which allows for local operation of a single corresponding valve assembly 100. For example, the individual control module 220 includes buttons or switches which allow a user to open or close the corresponding valve assembly 100. When pressed, these buttons cause the individual control module 220 to provide or transmit a control signal to the drive unit 210 to either open or close the corresponding valve assembly 100. The drive unit 210 is coupled to the valve handle 114 and is electrically driven by a control signal from the individual control module 220 or the master control module 230. In one embodiment, the individual control module 220 includes two membrane switches 252, 254 and two, three, or four light emitting diodes (LEDs). One of the membrane switches 254 opens the corresponding valve assembly 100 when pressed, while the other switch 252 closes the valve assembly 100. When the valve assembly 100 is open the LED above the switch 254 of the individual control module 220 is green. Conversely, when the valve assembly 100 is closed, the LED above the switch 252 of the individual control module 220 is red. A flashing green or flashing red LED indicates the valve assembly 100 is in transit toward the commanded (open or close) position. A blue LED 256 indicates a high water condition specific to the valve location and a yellow LED 258 indicates that power is supplied and that the fuse is intact.

Further, the individual control module 220 includes circuitry which receives one or more status signals from different sensors of the valve assembly 100, such as water level status signals and positional status signals. Based on these signals, the individual control module 220 can display at least some of the status information associated with the valve assembly 100, such as whether the valve assembly 100 is open or closed, the presence of a high water condition at the location of the corresponding connected valve assembly 100, and the presence of power. The circuitry of the individual control module 220 can include a transmitter 262 and a receiver 264 or a transceiver which enables communication between the individual control module 220 and the master control module 230 as well as communication between the individual control module 220 and the corresponding valve assembly 100.

The master control module 230 is optional and can communicate with a plurality of individual control modules and is capable of doing so wirelessly or in a wired fashion. Similarly to the individual control module 220, the master control module 230 can include a transmitter 302 and a receiver 304 or a transceiver. In this way, the master control module 230 can transmit commands to different individual control modules or receive status information from individual control modules. The use of transceivers enables the master control module 230 to be located remote from the individual control modules and corresponding valve assemblies. For example, the master control module 230 can be located at the helm of the vessel, the individual control module 220 can be located in an engine room, and the valve assembly 100 can be located on the hull of the vessel. In this way, the transmitter 302 can transmit sets of control signals to individual control modules in a wireless fashion.

In any event, the individual control module 220 can relay signal information from the valve assembly 100 to the master control module 230, which can be used as a platform to manage all of the valve assemblies of the vessel. The master control module 230 can include the transmitter 302 and receiver 304 or transceiver, a processor 310, a memory 312, an input component 314, a display 316, and an audio component 318 (e.g., a speaker or horn).

The master control module 230 can, at a glance, provide status information for one or more detected valve assemblies, such as a positional status of the valve assembly 100. In one embodiment, the display 316 and the input component 314 are integrated as a single unit, in the form of a touchscreen. The input component 314 is a component which allows users to enter a command pertaining to one or more of the valve assemblies. In other embodiments, the master control module 230 can be implemented as a mobile device, such as an application installed on a smartphone or a tablet. The input component 314 can be configured to provide one or more options for one or more different commands to be entered. Upon selection of a respective command, the receiver 304 can gather status signals from different valve assemblies and have the processor 310 react accordingly (e.g., based on the selected command and/or one or more selected valves). Regardless, the commands received at the input component 314 can be transmitted (e.g., as control signals) to an appropriate group of valve assemblies (or associated drive units) through respective individual control modules.

The receiver 304 can receive the status signals from one or more corresponding individual control modules. Examples of status signals include lock status signals indicative of a lock status of the valve assembly 100, water level status signals, automatic status signals, etc. The positional status signal is indicative of a positional status of the valve assembly 100 of the detected valve assemblies corresponding to a respective individual control module of the individual control modules. The water level status signal is indicative of the water level associated with the valve assembly 100 and is received from the water level sensors 192 of the valve assembly 100.

Further, the master control module 230 can, at the command of the user, operate one or more selected valve assemblies by transmitting or receiving commands at the input component 314. The input component 314 can transmit or receive a command or user inputs pertaining to at least one of the valve assemblies. Examples of commands include "exercise all", "open all", "close all", "assign group", "select valve(s)", etc. In one embodiment, the master control module 230 can be similar or have an identical hardware configuration to the individual control module, except that it is configured to act as a hub or "master" with respect to the other individual control modules.

The processor 310 can generate one or more sets of control signals for the valve assemblies associated with the command. The transmitter 302 can transmit sets of control signals to selected individual control modules, which in turn, pass the control signals to corresponding valve assemblies. Examples of commands include selecting the valve assembly 100, assigning the valve assembly 100 to a group, opening, closing, locking, unlocking, or toggling the valve assembly 100. The display 316 can render graphic elements indicative of a status for any one of the respective valve assemblies based on the status signals received from the individual control module.

Setup Valve Assemblies

In one embodiment, the master control module 230 can be utilized to detect and setup the detected valve assemblies. For example, the memory 312 of the master control module 230 can access or store a selection of vessel plans, and allow the user to select the plan which is indicative of a layout of the vessel. Alternately, the user can "upload" a vessel plan of their choosing. As valve assemblies are added, an icon is rendered on the display 316. The master control module 230 offers a keyboard for the naming of each valve (i.e., PORT ENGINE, GENERATOR, etc.) and allows each valve icon to be placed by "drag and drop" in its relative location on the vessel plan shown on the display 316. In this manner, at the conclusion of the setup process, a vessel plan is shown with all valve assemblies named and located accurately, thereby enabling the user to view all valve assemblies aboard the vessel at a glance, corresponding operational and position status, and to command status and/or position changes.

Figure 8:
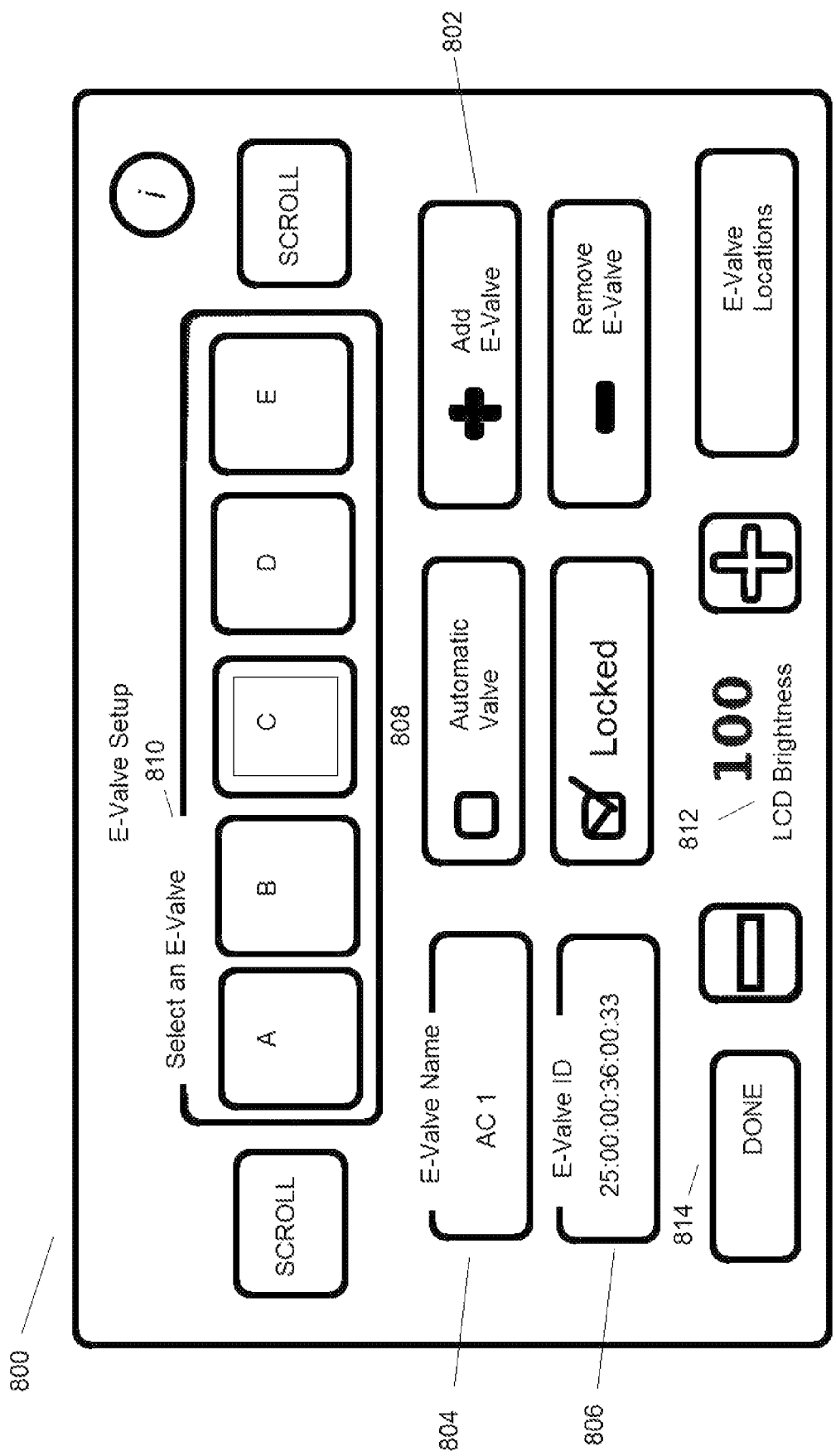
FIG. 8 is an illustration of an example interface rendered by the system of FIG. 5.

For example, as seen in FIG. 8, a menu or interface 800 can be displayed which includes a graphic element or an icon (e.g., a gear icon for setup), which when pressed or selected, enables the user to "Add an E-Valve" 802 or "Name an E-Valve" 804. Each valve assembly is uniquely identified and is individually addressed within the interface rendered by the display 316 (e.g., one graphic element is rendered for each valve assembly).

In one embodiment, the individual control module 220 assigns the valve 100 a unique identification number 806. In other embodiments, each individual control 220 comes with a pre-defined unique identification number, which is transmitted from the individual control module 220 to the master control module 230. The display 316 and input component 314 of the master control module 230 can be implemented to assign other types of information to the corresponding valve assembly, such as the location of the valve assembly in accordance with the vessel plan. Further, the input component 314 can assign an automatic status to a selected valve assembly through a graphic element 808 presented as a touchscreen option. When the selected valve assembly is designated with the automatic status, the valve assembly 100 is commanded by the processor 310 or individual control module 220 to open when an engine of the vessel is operating and to close when the engine ceases operation. Thus, the processor 310 can provide control signals to different or individual valve assemblies based on an operational status (e.g., engine active, engine inactive, vessel unattended, a failsafe condition, a water level, oil pressure, etc.) of the vessel.

In other embodiments, the display 316 can render a "find valve" interface which enables the user to utilize the input component 314 to enter a name or location associated with a valve assembly. The processor 310 can search for associated valve assemblies and have the display 316 render a list of results.

Status Display

Figure 9:
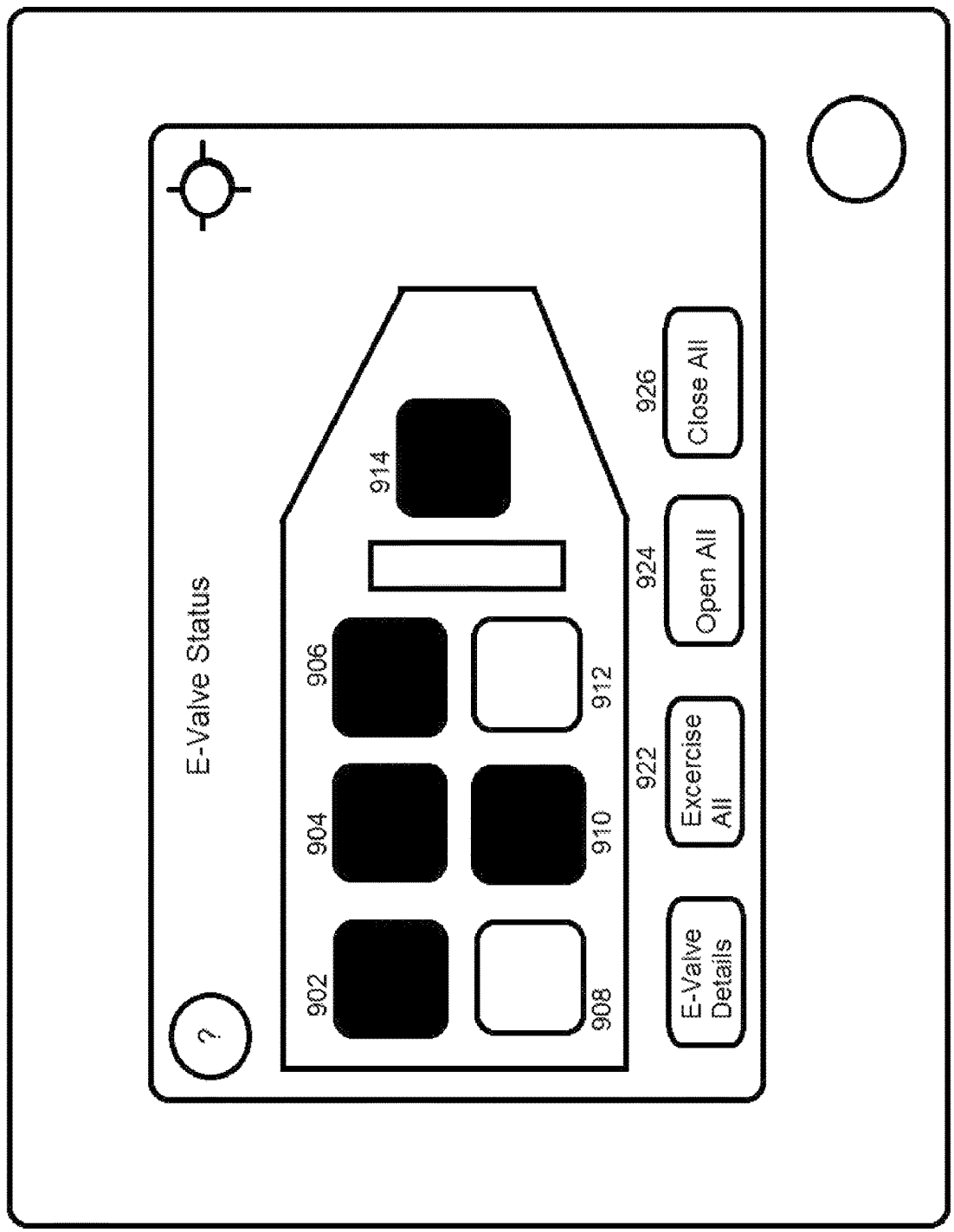
FIG. 9 is an illustration of an example interface rendered by the system of FIG. 5.

According to one aspect, when the user advances to a startup screen or a home screen, the display 316 can render graphic elements (902, 904, 906, 908, 910, and 912) indicative of the positional status and locations for the respective valve assemblies based on the positional status signals and identifiers received from the individual control module 220, as seen in FIG. 9. Further, the display 316 can render graphic elements indicative of the lock status for the valve assemblies based on the lock status signals received from the individual control modules. The display 316 can render different statuses in different colors and different operational statuses in different colors. For example, graphic elements can indicate the positional status of the corresponding valve assembly where a constant red color is indicative of the closed positional status and a constant green color is indicative of the open positional status. Blinking (or flashing) red or blinking green graphic elements mean that the valve assembly is in the process of closing or opening, respectively. The display 316 can provide a visual indication of the status of the valve assembly and a way to issue commands to the corresponding valve assembly, such as the graphic element 902, 904, 906, 908, 910, and 912, which are rendered as software icons or buttons, for example.

In an embodiment, a selected valve assembly icon can be rendered yellow in color. Thus, a group of selected valves would be displayed in yellow. In another embodiment, yellow is used to indicate that the valve assembly depicted is in automatic mode. Blue can be used to indicate that the valve assembly is locked. Orange can be used to indicate a problem with the corresponding valve assembly, such as a power failure, a jammed component, a blown fuse, etc.

Other status information can be rendered by the display 316 for each of the valve assemblies. Examples of status information include an operational state of the valve assembly, a function of the valve assembly, flow rate information (e.g., obtained from a flow meter or sensor on the valve assembly), positional status of the valve assembly, high water in a specific valve assembly location, and position of the valve according to the vessel plan.

Lock Valve

In one embodiment, the master control module 230 can lock one or more valves in the open position or the closed position. After confirming the valve is in the desired open or closed position, with reference to FIG. 8, a valve may be selected for locking by scrolling left or scrolling right until the desired valve assembly appears in the center position 810 of the set-up screen 800, identified by a white frame around the icon. When "locked" 812 is pressed the icon is displayed in a blue color and the "locked" box 812 displays a check mark. When "Done" 814 is pressed, master control 230 commands actuation cam 134 to rotate 90-degrees counter-clockwise from the "Ready Position" to provide a mechanical lock of handle 114 in the open (vertical) position. This is shown more clearly in FIGS. 6A-6B.

Similarly, the master control module 230 can lock one or more valves in the closed position. After confirming the valve is closed, referring to FIG. 8, a valve may be selected for locking by scrolling left or scrolling right until the desired valve assembly appears in the center position 810 of the set-up screen 800, identified by a white frame around the icon. When "locked" 812 is pressed the icon is displayed in a blue color and the "locked" box 812 displays a check mark. When "Done" 814 is pressed, master control 230 commands actuation cam 134 to rotate 90-degrees clockwise from the "Ready Position" to provide a mechanical lock of handle 114 in the open (horizontal) position. This is shown more clearly in FIGS. 6D-6E.

The master control module 230 can override the locked option and respond to the "Close All" command by closing valves that are locked open.

Exercise All

In one embodiment, the master control module 230 can be utilized to exercise all detected valve assemblies which are not associated with a "locked" lock status. A "valve exercise" is a command that cycles or toggles the valve assembly from its present (e.g., open or closed) position to the opposite position, and returns the valve to its original position. This may be done to a selected group of valve assemblies or a group of "all" valve assemblies (subject to the lock status). The display 316 can render the "exercise all" graphic element 922 at an interface 900 upon startup of the master control module 230 or universally across different interfaces as an option for the user. When the input component 314 receives the "exercise all" command, the processor 310 checks the lock status signals to determine which valve assemblies are locked and which valve assemblies are unlocked. The lock status signals are received by the receiver 304 from the corresponding individual control modules. The processor 310 determines a group of all of the valve assemblies having the "unlocked" lock status as the group which will be exercised. Within this group of valve assemblies having the "unlocked" lock status, the processor 310 issues a first set of control signals to a first subgroup, and a second set of control signals to a second subgroup.

At the completion of each open or close command, the master control module 230 or the individual control module may command the actuation cam 134 to return to the ready position, as shown in FIGS. 6A and 6E.

The first subgroup is defined as a group of detected valve assemblies which has the "unlocked" lock status and also has the open positional status. For this first subgroup, the processor 310 generates a set of control signals to close these valve assemblies and subsequently re-open. The transmitter 302 transmits this set of control signals to the first subgroup of valve assemblies (e.g., the initial close command is transmitted, followed by the open command).

The second subgroup is defined as a group of detected valve assemblies which has the "unlocked" lock status and has the closed positional status. For this second subgroup, the processor 310 generates a set of control signals to open these valve assemblies and subsequently re-close.

In one embodiment, the transmitter 302 waits for a confirmation from the user prior to transmitting the corresponding exercise control signals to the first and second subgroups of valve assemblies. In other embodiments, "exercise all" can be automatically implemented by the processor 310 at startup or at one or more periodic time intervals, such as "Exercise once per week" (e.g., 168 hours) or "Exercise every day" (e.g., 24 hours). In this way, valve stiffness due to marine growth or corrosion can be mitigated.

Open All

In one embodiment, the master control module 230 can be utilized to open all detected valve assemblies which are not associated with a "locked" lock status. Similarly to the "exercise all" embodiment, merely the valve assemblies which have the "unlocked" lock status are provided with the open command. Thus, when the "open all" command is received at the input component 314 by a touch of the "open all" graphic element 924, the processor 310 checks the lock status signals to determine which valve assemblies are locked and which valve assemblies are unlocked and the positional status to determine the closed valve assemblies. The processor 310 determines a group of all of the valve assemblies having the "unlocked" lock status and the closed positional status as the group which will be exercised. In an embodiment, valve assemblies associated with an automatic status are excluded from this group. The processor 310 issues a set of control signals to this group to open the valve assemblies, and the transmitter 302 transmits the control signals accordingly.

Close All

The "Close All" command can be used as an emergency action. In one embodiment, the master control module 230 can be utilized to close all detected valve assemblies, regardless of the lock status of these valve assemblies. Unlike the other "exercise all" or "open all" embodiments, all the detected valve assemblies are provided with the close command. In other words, the "all" group for the "close all" command and the "all" group for the "exercise all" and "open all" command are not necessarily the same. Thus when the "close all" command is received via the "close all" graphic element 926 input component 314, the processor 310 issues a set of control signals to all detected valve assemblies having the open positional status to close, and the transmitter 302 transmits the control signals accordingly to respective individual control modules. In one embodiment, the display 316 renders a notification or a confirmation which requires user input or user confirmation before the transmitter 302 transmits the close command to the open valve assemblies.

Select, Deselect, and Group Valve Assemblies

In one embodiment, the master control module 230 can be utilized to select the detected valve assemblies. For example, the input component 314 can receive an assignment command assigning the selected valve assemblies to a group. An example of the assignment input could be a drag and drop operation. An example of a selection command could be a press and hold operation at the graphic element of an interface 900. Thus, groups of valve assemblies can be defined and addressed with a single command. When groups are created, the display 316 can render a graphic element for that group, which allows the user to lock, unlock, open, close, or provide other commands to that group. In this way, commands received by the input component 314 can pertain to the group of valve assemblies, rather than a single valve assembly.

Command Selected Valve Assemblies (Open, Close, Lock, Unlock, Exercise)

In one embodiment, the master control module 230 can be utilized to command selected valve assemblies. The display 316 can render one or more graphic elements which represent the valve assemblies or one or more groups of valve assemblies. Using the input component 314, the user can select a particular valve assembly or group of valve assemblies, such as by touching the corresponding graphic element on the display 316 or touchscreen. Depending on the status of the valve assembly, different options can be displayed.

In other words, the processor 310 receives positional signals (indicative of whether the valve assembly is open or closed) and automatic signals from each individual control modules 220, and locked or unlocked signals from master control 230. Based on this status signal information, the processor 310 can cause the display to render available options.

For example, if the valve is in the "locked" lock status, an unlock option is rendered on the display 316. Thus, when the "unlock" command is received at the input component 314, the processor 310 assigns the "unlocked" lock status to the valve assemblies associated with this command (e.g., the selected valve assemblies).

Continuing on, if the valve is in the "unlocked" lock status, a lock option is rendered on the display 316. When the valve assembly has the "unlocked" lock status, that valve assembly is included in the "open all" and "exercise all" command group. However, when the valve assembly has the "locked" lock status, that valve assembly is not included in the "open all" and the "exercise all" command group. Stated another way, when the "lock" command is received at the input component 314, as applied to the selected valve assemblies, the processor 310 assigns the "locked" lock status to the valve assemblies which are selected. This means that further "exercise all" and "open all" commands to these locked valve assemblies (e.g., associated with the "locked" lock status) are ignored such that the positional status of the locked valve assemblies is maintained in their current positional states.

When the "locked" lock status is commanded for any valve, the individual control 220 commands the actuation cam 134 to rotate 90-degrees away from the ready position to the "Open Locked" position (e.g., shown in FIG. 6B) or to the "Closed Locked" position (e.g., shown in FIG. 6D) for the purpose of affecting a "mechanical lock" of actuation cam 134 against the handle 114 of the valve 100, thereby preventing unwanted manual or electric actuation of valve 100. When the "locked" lock status is changed to "unlocked" lock status, the individual control module 220 commands actuation cam 134 to return 90-degrees to the "Ready Position", shown in FIG. 6A or FIG. 6E.

Conversely, the "close all" command results in all detected valve assemblies being closed, regardless of the lock status of the valve assembly.

Open and close command options are presented based on the current positional status of the valve assembly. The receiver 304 of the master control module 230 receives the status signals from the individual control module 220 (which receives the status signals from sensors of the valve assembly 100). These status signals can be received by the processor 310 and rendered as graphic elements on the display 316, thereby indicating to the user whether the valve assembly is locked, unlocked, open, closed, or in a transition between opening and closing.

At one screen or interface rendered by the display 316, the statuses of individual valve assemblies is rendered, illustrating for example, the positional status and the lock status of detected valve assemblies. When a specific valve assembly or group of valve assemblies is selected, the processor 310 determines available commands which are applicable to the selected valve assembly or group of valve assemblies, and the display 316 renders these available commands as different graphic elements. When one of the commands is selected by the user (e.g., via the input component 314), the processor 310 generates one or more sets of control signals which correspond to the selected command for the valve assemblies associated with the command (e.g., valve assemblies which are currently selected). The transmitter 302 transmits the sets of control signals to selected individual control modules, which pass the control signals to drive units of the corresponding valve assemblies. The display 316 can render graphic elements indicative of the status for the valve assemblies as the commands are executed.

Following the completion of an "open" or "close" command to the valve assembly, the individual control module 220 can generate a control signal which causes the drive unit 120 of the valve assembly to return the actuation cam 134 to a ready position, shown in FIGS. 6A and 6E.

Water Level Alert

In one embodiment, the master control module 230 can provide alerts pertaining to high water levels in a specific area of the vessel when the receiver 304 receives a water level status signal from the individual control module 220 which is indicative of a water level associated with the valve assembly being above a threshold level. As previously discussed, this can be achieved by having two or more water level sensors 192 which form a closed loop when the water level is high enough such that both water level sensors 192 are underwater. This electrical connection results in the sensors transmitting a water level status signal to the individual control module 220 and illuminate the blue LED 256 on the individual control module 220, which optionally passes the signal to the master control module 230. When the master control module 230 (optionally) receives this signal, the processor 310 can cause the display 316 to render a graphic element indicative of the high water level status for the corresponding valve assembly. Further, the processor 310 can command the audio component 318 to play an audio alert when the water level is greater than this threshold level. In certain scenarios, the processor 310 can also order all valves to be closed using a "close all" command when the threshold is exceeded.

Figure 10:
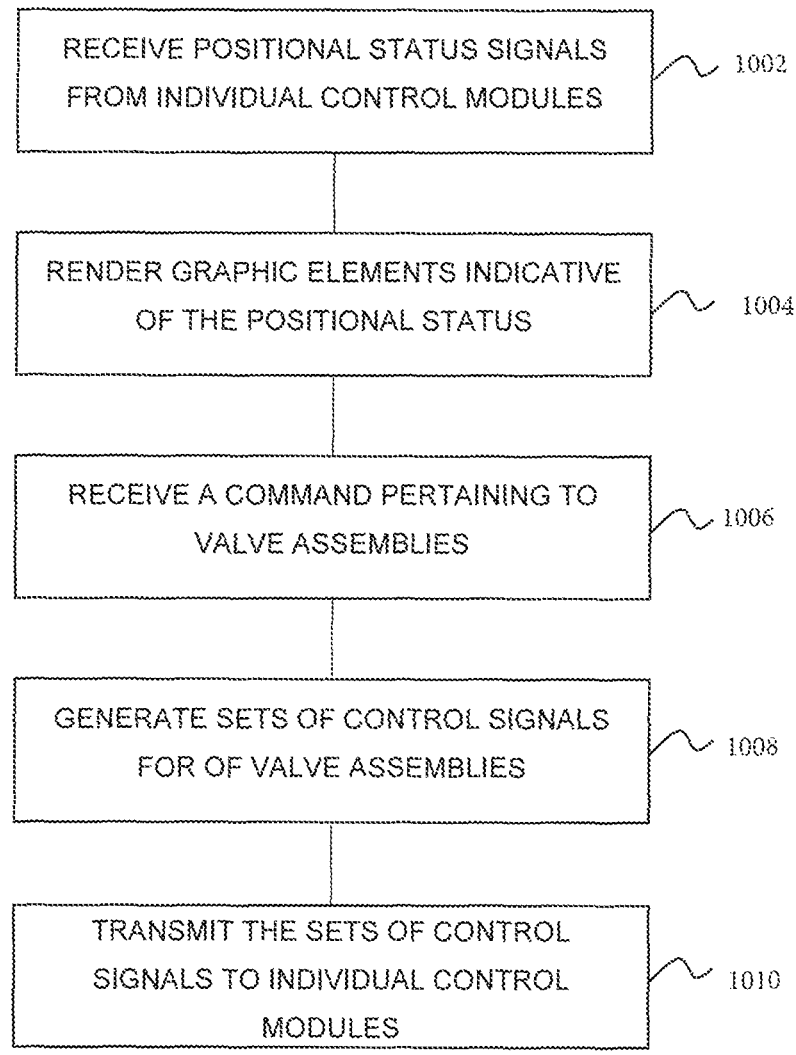
FIG. 10 is a flow diagram of a method for maintaining and operating valve assemblies, such as the valve assembly of FIGS. 1A-1B.

FIG. 10 is a flow diagram of a method 1000 for maintaining and operating valve assemblies, according to one embodiment. The method may include receiving one or more positional status signals from one or more corresponding individual control modules at 1002, rendering one or more graphic elements indicative of the positional status for the respective valve assemblies corresponding to the one or more individual control modules at 1004, receiving a command pertaining to one or more of the valve assemblies at 1006, generating one or more sets of control signals for one or more of the valve assemblies associated with the command at 1008, and transmitting the one or more sets of control signals to the one or more individual control modules at 1010.

It will be appreciated that various of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A method for controlling multiple valve assemblies on a marine vessel, comprising:
   receiving one or more positional status signals from one or more corresponding individual control modules, each positional status signal indicative of a positional status of a valve assembly of the multiple valve assemblies corresponding to a respective individual control module of the one or more individual control modules;
   rendering one or more graphic elements indicative of the positional status for the respective valve assemblies corresponding to the one or more individual control modules;
   receiving a command pertaining to one or more of the valve assemblies;
   generating one or more sets of control signals for one or more of the valve assemblies associated with the command;
   transmitting the one or more sets of control signals to the one or more individual control modules; and
   receiving one or more water level status signals from the one or more corresponding individual control modules, each water level status signal indicative of a water level associated with the valve assembly of the multiple valve assemblies and received from a water level sensor from the valve assembly,
   wherein one or more of the individual control modules is configured to control a position of one or more of the corresponding valve assemblies based on one or more sets of the control signals,
   wherein one or more of the individual control modules is configured to receive the command via a switch and control the position of one or more of the corresponding valve assemblies based on the command from the switch, and
one or more of:
wherein the command is an "exercise all" command; or
wherein the command is an "open all" command;
when the command is an "exercise all" command:
receiving one or more lock status signals from the one or more corresponding individual control modules, each lock status signal indicative of a lock status of the valve assembly of the multiple valve assemblies, wherein the lock status is at least one of locked or unlocked, and wherein the positional status is at least one of open or closed;
generating the one or more sets of control signals for the valve assemblies having an "unlocked" lock status;
transmitting the one or more sets of control signals to the one or more individual control modules such that of the valve assemblies having the "unlocked" lock status:
valve assemblies associated with the open positional status are commanded to close, then re-open; and
valve assemblies associated with the closed positional status are commanded to open, then re-close;
when the command is an "open all" command:
receiving one or more lock status signals from the one or more corresponding individual control modules, each lock status signal indicative of a lock status of the valve assembly of the multiple valve assemblies, wherein the lock status is at least one of locked or unlocked, and wherein the positional status is at least one of open or closed;
generating the one or more sets of control signals for the valve assemblies having an "unlocked" lock status; and
transmitting the one or more sets of control signals to the one or more individual control modules such that of the valve assemblies having the "unlocked" lock status, valve assemblies associated with the closed positional status are commanded to open.

2. A master control module controlling multiple valve assemblies on a marine vessel, comprising:
a receiver that receives one or more positional status signals from one or more corresponding individual control modules, each positional status signal indicative of a positional status of a valve assembly of the multiple valve assemblies corresponding to a respective individual control module of the one or more individual control modules;
a display that renders one or more graphic elements indicative of the positional status for the respective valve assemblies corresponding to the one or more individual control modules;
an input component that receives a command pertaining to one or more of the valve assemblies;
a processor that generates one or more sets of control signals for one or more of the valve assemblies associated with the command;
a transmitter that transmits the one or more sets of control signals to the one or more individual control modules,
wherein one or more of the individual control modules is configured to control a position of one or more of the corresponding valve assemblies based on one or more sets of the control signals, and
wherein one or more of the individual control modules is configured to receive the command via a switch and control the position of one or more of the corresponding valve assemblies based on the command from the switch,
wherein the receiver receives one or more water level status signals from the one or more corresponding individual control modules, each water level status signal indicative of a water level associated with the valve assembly of the multiple valve assemblies and received from a water level sensor from the valve assembly,
wherein the display renders one or more graphic elements indicative of the water level status for the respective valve assemblies, and
wherein the input component provides an option for an "exercise all" command to be entered and upon selection of the "exercise all" command:
the receiver receives one or more lock status signals from the one or more corresponding individual control modules, each lock status signal indicative of a lock status of the valve assembly of the multiple valve assemblies, wherein the lock status is at least one of locked or unlocked, and wherein the positional status is at least one of open or closed;
the processor generates the one or more sets of control signals for the valve assemblies having an "unlocked" lock status;
the transmitter that transmits the one or more sets of control signals to the one or more individual control modules such that of the valve assemblies having the "unlocked" lock status;
valve assemblies associated with the open positional status are commanded to close, then re-open; and
valve assemblies associated with the closed positional status are commanded to open, then re-close.

3. The master control module of claim 2, wherein:
the input component provides an option for an assignment command to be entered and upon selection of the assignment command assigns one or more selected valve assemblies to a group; and
the command received by the input component is a command pertaining to the group of valve assemblies.

4. The master control module of claim 2, wherein:
the input component provides an option for a selection command to be entered and upon receipt of the selection command, selecting one or more corresponding valve assemblies; and
the command received by the input component is a command pertaining to the selected valve assemblies.

5. The master control module of claim 2, wherein the transmitter transmits the one or more sets of control signals to one or more of the individual control modules in a wireless fashion.

6. The master control module of claim 2, wherein:
the positional status is at least one of open or closed;
the input component provides an option for a "lock" command to be entered and upon selection of the "lock" command:
the processor assigns a "locked" lock status to corresponding valve assemblies, wherein further "exercise all" and "open all" commands to valve assemblies associated with the "locked" lock status are ignored such that the positional status of the locked valve assemblies is maintained.

7. The master control module of claim 2, wherein:
the input component provides an option for an "unlock" command to be entered and upon selection of the "unlock" command:
the processor assigns an "unlocked" lock status to corresponding valve assemblies.

8. The master control module of claim 2, wherein the display renders different positional statuses in different colors and different operational statuses in different colors.

9. The master control module of claim 2, wherein the input component and display are a touchscreen.

10. A master control module controlling multiple valve assemblies on a marine vessel, comprising:
- a receiver that receives one or more positional status signals from one or more corresponding individual control modules, each positional status signal indicative of a positional status of a valve assembly of the multiple valve assemblies corresponding to a respective individual control module of the one or more individual control modules;
- a display that renders one or more graphic elements indicative of the positional status for the respective valve assemblies corresponding to the one or more individual control modules;
- an input component that receives a command pertaining to one or more of the valve assemblies;
- a processor that generates one or more sets of control signals for one or more of the valve assemblies associated with the command; and
- a transmitter that transmits the one or more sets of control signals to the one or more individual control modules,
- wherein one or more of the individual control modules is configured to control a position of one or more of the corresponding valve assemblies based on one or more sets of the control signals,
- wherein one or more of the individual control modules is configured to receive the command via a switch and control the position of one or more of the corresponding valve assemblies based on the command from the switch,
- wherein the receiver receives one or more water level status signals from the one or more corresponding individual control modules, each water level status signal indicative of a water level associated with the valve assembly of the multiple valve assemblies and received from a water level sensor from the valve assembly,
- wherein the display renders one or more graphic elements indicative of the water level status for the respective valve assemblies, and
- wherein the input component provides an option for an "open all" command to be entered and upon selection of the "open all" command:
- the receiver receives one or more lock status signals from the one or more corresponding individual control modules, each lock status signal indicative of a lock status of the valve assembly of the multiple valve assemblies, wherein the lock status is at least one of locked or unlocked, and wherein the positional status is at least one of open or closed;
- the processor generates the one or more sets of control signals for the valve assemblies having an "unlocked" lock status; and
- the transmitter that transmits the one or more sets of control signals to the one or more individual control modules such that of the valve assemblies having the "unlocked" lock status, valve assemblies associated with the closed positional status are commanded to open.

11. A master control module controlling multiple valve assemblies on a marine vessel, comprising:
- a receiver that receives one or more positional status signals from one or more corresponding individual control modules, each positional status signal indicative of a positional status of a valve assembly of the multiple valve assemblies corresponding to a respective individual control module of the one or more individual control modules;
- a display that renders one or more graphic elements indicative of the positional status for the respective valve assemblies corresponding to the one or more individual control modules;
- an input component that receives a command pertaining to one or more of the valve assemblies;
- a processor that generates one or more sets of control signals for one or more of the valve assemblies associated with the command; and
- a transmitter that transmits the one or more sets of control signals to the one or more individual control modules,
- wherein one or more of the individual control modules is configured to control a position of one or more of the corresponding valve assemblies based on one or more sets of the control signals,
- wherein one or more of the individual control modules is configured to receive the command via a switch and control the position of one or more of the corresponding valve assemblies based on the command from the switch,
- wherein the receiver receives one or more water level status signals from the one or more corresponding individual control modules, each water level status signal indicative of a water level associated with the valve assembly of the multiple valve assemblies and received from a water level sensor from the valve assembly, and
- wherein the display renders one or more graphic elements indicative of the water level status for the respective valve assemblies,
- the input component provides an option for a "close all" command to be entered and upon selection of the "close all" command:
- wherein the positional status of the multiple valve assemblies is at least one of open or closed;
- the processor generates the one or more sets of control signals for the valve assemblies having the open positional status; and
- the transmitter that transmits the one or more sets of control signals to the one or more individual control modules such that valve assemblies associated with the open positional status are commanded to close.

12. The master control module of claim 11, wherein:
the display renders a notification; and
the input component receives a confirmation input prior to the transmitter transmitting the one or more sets of control signals to command closure of the valve assemblies.

* * * * *